US007959780B2

(12) United States Patent
Hawkins et al.

(10) Patent No.: US 7,959,780 B2
(45) Date of Patent: *Jun. 14, 2011

(54) TEXTURED ION EXCHANGE MEMBRANES

(75) Inventors: John Hawkins, Redwood City, CA (US); Eric Nyberg, Belmont, CA (US); George Kayser, Redwood City, CA (US)

(73) Assignee: Emporia Capital Funding LLC, Los Angeles, CA (US)

( * ) Notice: Subject to any disclaimer, the term of this patent is extended or adjusted under 35 U.S.C. 154(b) by 1897 days.

This patent is subject to a terminal disclaimer.

(21) Appl. No.: 10/900,256

(22) Filed: Jul. 26, 2004

(65) Prior Publication Data

US 2006/0016685 A1 Jan. 26, 2006

(51) Int. Cl.
*B01D 61/44* (2006.01)

(52) U.S. Cl. ........ 204/536; 204/537; 204/538; 204/631; 204/632

(58) Field of Classification Search .................. 204/536, 204/537, 538, 631, 632
See application file for complete search history.

(56) References Cited

U.S. PATENT DOCUMENTS

| 2,470,741 A | 5/1949 | Gordon |
| 2,726,356 A | 12/1955 | Rockafellow |
| 2,974,681 A | 7/1957 | Whitehurst |
| 2,825,666 A | 3/1958 | Stoddard |
| 2,829,095 A | 4/1958 | Oda |
| 2,863,813 A | 12/1958 | Juda et al. |
| 3,003,940 A | 10/1961 | Mason et al. |
| 3,233,732 A | 2/1966 | Lung et al. |
| 3,250,695 A | 5/1966 | Winslow, Jr. et al. |
| 3,368,871 A | 2/1968 | O'Connor et al. |
| 3,398,069 A | 8/1968 | Juda |
| 3,398,091 A | 8/1968 | Greatorex |
| 3,412,006 A | 11/1968 | Alexander et al. |
| 3,420,773 A | 1/1969 | Selmeczi |
| 3,433,726 A | 3/1969 | Parsi et al. |
| 3,440,149 A | 4/1969 | Parsi et al. |
| 3,440,159 A | 4/1969 | McRae et al. |
| 3,446,724 A | 5/1969 | Winslow, Jr. et al. |
| 3,454,472 A | 7/1969 | Giuffrida |
| 3,475,122 A | 10/1969 | McRae et al. |
| 3,475,143 A | 10/1969 | O'Connor et al. |

(Continued)

FOREIGN PATENT DOCUMENTS

CA 2228886 8/1999

(Continued)

OTHER PUBLICATIONS

Alcaraz et al. Conductive and Capacitive Properties of the Bipolar Membrane Junction Studied by AC Impedance Spectroscopy 2001. J. Phys Chem. B. 105, 11669-11677.*

(Continued)

*Primary Examiner* — Arun S Phasge
(74) *Attorney, Agent, or Firm* — Janah & Associates, P.C.; Ashok K. Janah

(57) ABSTRACT

A textured water-splitting membrane comprises an anion exchange layer abutting a cation exchange layer to form a heterogeneous water-splitting interface therebetween, and a textured surface having a pattern of texture features comprising spaced apart peaks and valleys. The membranes can also have an integral spacer on the membrane. A cartridge can be fabricated with a plurality of the membranes for use in an electrochemical cell. The electrochemical cell can be part of an electrochemical ion exchange system.

44 Claims, 7 Drawing Sheets

U.S. PATENT DOCUMENTS

| | | |
|---|---|---|
| 3,476,600 A | 11/1969 | Morgan, Jr. |
| 3,480,495 A | 11/1969 | Sohn et al. |
| 3,485,576 A | 12/1969 | McRae et al. |
| 3,496,091 A | 2/1970 | McGriff et al. |
| 3,496,453 A | 2/1970 | Swain |
| 3,502,429 A | 3/1970 | Sanders |
| 3,515,513 A | 6/1970 | Parsi |
| 3,518,174 A | 6/1970 | Inoue |
| 3,520,803 A | 7/1970 | Iaconelli |
| 3,523,755 A | 8/1970 | McRae |
| 3,523,880 A | 8/1970 | Parsi |
| 3,524,801 A | 8/1970 | Parsi |
| 3,525,682 A | 8/1970 | McRae et al. |
| 3,542,205 A | 11/1970 | O'Cheskey |
| 3,547,801 A | 12/1970 | Albright et al. |
| 3,554,895 A | 1/1971 | McRae et al. |
| 3,558,279 A | 1/1971 | McRae et al. |
| 3,562,139 A | 2/1971 | Leitz |
| 3,567,864 A | 3/1971 | Palmer et al. |
| 3,589,999 A | 6/1971 | McRae et al. |
| 3,607,417 A | 9/1971 | McRae et al. |
| 3,607,706 A | 9/1971 | Eisenmann et al. |
| 3,608,610 A | 9/1971 | Greatorex et al. |
| 3,616,312 A | 10/1971 | McGriff et al. |
| 3,621,173 A | 11/1971 | O'Cheskey |
| 3,627,133 A | 12/1971 | Rak |
| 3,643,806 A | 2/1972 | O'Cheskey |
| 3,645,882 A | 2/1972 | Parsi |
| 3,645,884 A | 2/1972 | Gilliland |
| 3,654,103 A | 4/1972 | McRae |
| 3,654,125 A | 4/1972 | Leitz et al. |
| 3,657,104 A | 4/1972 | Hodgdon, Jr. |
| 3,661,647 A | 5/1972 | Owens et al. |
| 3,661,762 A | 5/1972 | Parsi |
| 3,663,299 A | 5/1972 | Owens et al. |
| 3,664,832 A | 5/1972 | Paton |
| 3,669,857 A | 6/1972 | Kirkham et al. |
| 3,672,841 A | 6/1972 | Freeman, Jr. et al. |
| 3,675,041 A | 7/1972 | Elliot et al. |
| 3,695,444 A | 10/1972 | Iaconelli |
| 3,695,446 A | 10/1972 | Lyall et al. |
| 3,700,934 A | 10/1972 | Swain |
| 3,701,360 A | 10/1972 | Morrison |
| 3,717,256 A | 2/1973 | Parrott et al. |
| 3,720,329 A | 3/1973 | Gamble |
| 3,738,812 A | 6/1973 | Berry et al. |
| RE27,701 E | 7/1973 | Allan, Jr. et al. |
| 3,749,655 A | 7/1973 | Hodgdon, Jr. |
| 3,765,035 A | 10/1973 | Mutchler |
| 3,765,225 A | 10/1973 | Rivers |
| 3,766,712 A | 10/1973 | Schaltenbrand |
| 3,772,189 A | 11/1973 | Kreusch et al. |
| 3,774,763 A | 11/1973 | Yall et al. |
| 3,774,802 A | 11/1973 | O'Cheskey |
| 3,775,135 A | 11/1973 | Harper |
| 3,785,954 A | 1/1974 | Herbert |
| 3,787,339 A | 1/1974 | Hodgdon, Jr. et al. |
| 3,794,460 A | 2/1974 | Kirk |
| 3,805,833 A | 4/1974 | Teed |
| 3,814,688 A | 6/1974 | Hirs |
| 3,817,703 A | 6/1974 | Atwood |
| 3,826,614 A | 7/1974 | Capuano |
| 3,826,618 A | 7/1974 | Capuano |
| 3,827,564 A | 8/1974 | Rak |
| 3,840,341 A | 10/1974 | Rogers |
| 3,843,523 A | 10/1974 | Dresen et al. |
| 3,847,765 A | 11/1974 | Uno et al. |
| 3,850,797 A | 11/1974 | Lyall |
| B408,749 I5 | 1/1975 | Westlin |
| 3,869,376 A | 3/1975 | Tejeda |
| 3,883,383 A * | 5/1975 | Leitz, Jr. ............ 156/242 |
| 3,887,499 A | 6/1975 | Hodgdon, Jr. |
| 3,896,015 A | 7/1975 | McRae |
| 3,926,071 A | 12/1975 | Elliott |
| 3,926,864 A | 12/1975 | Hodgdon, Jr. |
| 3,954,592 A | 5/1976 | Horvath |
| 3,958,960 A | 5/1976 | Bakke |
| 3,958,961 A | 5/1976 | Bakke |
| 3,964,985 A | 6/1976 | Giuffrida |
| 3,972,815 A | 8/1976 | O'Cheskey et al. |
| 3,975,567 A | 8/1976 | Lock |
| 3,978,266 A | 8/1976 | Lock |
| 3,978,855 A | 9/1976 | McRae et al. |
| 3,993,517 A | 11/1976 | Schneider |
| 3,997,927 A | 12/1976 | Culligan |
| 4,012,310 A | 3/1977 | Clark et al. |
| 4,024,043 A | 5/1977 | Dege |
| 4,031,918 A | 6/1977 | Cagle et al. |
| 4,032,452 A | 6/1977 | Davis |
| 4,057,483 A | 11/1977 | Giuffrida |
| 4,062,756 A | 12/1977 | Jha et al. |
| 4,067,794 A | 1/1978 | Ganzi et al. |
| 4,073,632 A | 2/1978 | Reinauer et al. |
| 4,074,983 A | 2/1978 | Bakke |
| D248,157 S | 6/1978 | Ganzi et al. |
| 4,107,015 A | 8/1978 | Chlanda |
| 4,110,265 A | 8/1978 | Hodgdon |
| 4,115,225 A | 9/1978 | Parsi |
| 4,124,478 A | 11/1978 | Tsien et al. |
| 4,133,641 A | 1/1979 | Lueck |
| 4,140,591 A | 2/1979 | Fong et al. |
| 4,146,455 A | 3/1979 | McRae |
| 4,148,708 A | 4/1979 | Grant |
| 4,173,524 A | 11/1979 | McRae |
| 4,180,451 A | 12/1979 | McRae |
| 4,183,399 A | 1/1980 | Seehausen |
| 4,191,811 A | 3/1980 | Hodgdon |
| 4,202,772 A | 5/1980 | Goldstein |
| 4,216,073 A | 8/1980 | Goldstein |
| 4,217,186 A | 8/1980 | McRae |
| 4,225,412 A | 9/1980 | Reiss |
| 4,230,544 A | 10/1980 | McRae |
| 4,231,855 A | 11/1980 | Hodgdon et al. |
| 4,242,185 A | 12/1980 | McRae |
| 4,255,012 A | 3/1981 | Parent et al. |
| 4,257,887 A | 3/1981 | Rak et al. |
| 4,270,935 A | 6/1981 | Reinauer |
| 4,275,227 A | 6/1981 | MacDonald |
| 4,276,140 A | 6/1981 | Jain |
| 4,284,492 A | 8/1981 | Karn |
| 4,298,442 A | 11/1981 | Giuffrida |
| 4,299,677 A | 11/1981 | Venkatasubramanian et al. |
| 4,299,698 A | 11/1981 | Rak et al. |
| 4,310,631 A | 1/1982 | MacDonald |
| 4,316,125 A | 2/1982 | Noguchi |
| 4,321,192 A | 3/1982 | Jain |
| 4,322,275 A | 3/1982 | Jain |
| 4,332,680 A | 6/1982 | O'Cheskey |
| 4,344,781 A | 8/1982 | Higgins et al. |
| 4,351,710 A | 9/1982 | Jain |
| 4,372,821 A | 2/1983 | Reinauer |
| 4,373,031 A | 2/1983 | Waite |
| 4,374,206 A | 2/1983 | MacDonald et al. |
| 4,374,720 A | 2/1983 | MacDonald |
| 4,381,232 A | 4/1983 | Brown |
| 4,391,680 A | 7/1983 | Mani et al. |
| 4,396,477 A | 8/1983 | Jain |
| 4,426,323 A | 1/1984 | Jain |
| 4,435,318 A | 3/1984 | Pabst et al. |
| 4,441,978 A | 4/1984 | Jain |
| 4,446,352 A | 5/1984 | O'Cheskey et al. |
| 4,461,693 A | 7/1984 | Jain |
| 4,461,945 A | 7/1984 | O'Cheskey et al. |
| 4,463,064 A | 7/1984 | Ruch et al. |
| 4,465,573 A | 8/1984 | O'Hare |
| 4,504,373 A | 3/1985 | Mani et al. |
| 4,505,797 A | 3/1985 | Hodgdon et al. |
| 4,528,173 A | 7/1985 | Seamans |
| 4,534,867 A | 8/1985 | Kreusch et al. |
| 4,536,845 A | 8/1985 | DeVale et al. |
| 4,551,209 A | 11/1985 | Lauks |
| 4,584,075 A | 4/1986 | Goldstein et al. |
| 4,587,269 A | 5/1986 | Thomas, Jr. |
| 4,592,817 A | 6/1986 | Chlanda et al. |
| 4,594,135 A | 6/1986 | Goldstein |
| 4,606,943 A | 8/1986 | Rak et al. |
| 4,608,140 A | 8/1986 | Goldstein |

| Patent No. | Date | Inventor |
|---|---|---|
| 4,609,007 A | 9/1986 | Uhl et al. |
| 4,613,422 A | 9/1986 | Lauks |
| 4,614,576 A | 9/1986 | Goldstein |
| 4,617,321 A | 10/1986 | MacDonald |
| 4,622,123 A | 11/1986 | Nejame, Jr. |
| 4,629,424 A | 12/1986 | Lauks et al. |
| 4,636,289 A | 1/1987 | Mani et al. |
| 4,643,814 A | 2/1987 | Goldstein |
| 4,645,625 A | 2/1987 | Lundstrom |
| 4,661,224 A | 4/1987 | Goldstein et al. |
| 4,661,896 A | 4/1987 | Kobayashi et al. |
| 4,663,144 A | 5/1987 | McQuillan et al. |
| 4,668,402 A | 5/1987 | Norton |
| 4,671,863 A | 6/1987 | Tejeda |
| 4,673,483 A | 6/1987 | Mandle |
| 4,678,553 A | 7/1987 | Mandle et al. |
| 4,678,565 A | 7/1987 | Norton |
| 4,707,240 A | 11/1987 | Parsi et al. |
| 4,731,049 A | 3/1988 | Parsi |
| 4,735,717 A | 4/1988 | Sims |
| 4,739,380 A | 4/1988 | Lauks et al. |
| 4,750,983 A | 6/1988 | Foster et al. |
| 4,760,328 A | 7/1988 | Groves |
| 4,764,315 A | 8/1988 | Brusa |
| 4,769,135 A | 9/1988 | Norton |
| 4,775,703 A | 10/1988 | Susa |
| 4,781,809 A | 11/1988 | Falcone, Jr. |
| 4,795,537 A | 1/1989 | Timewell |
| 4,802,984 A | 2/1989 | Waite |
| 4,804,451 A | 2/1989 | Palmer |
| 4,806,291 A | 2/1989 | Susa |
| 4,822,471 A | 4/1989 | MacDonald |
| 4,838,312 A | 6/1989 | Berchem et al. |
| 4,851,100 A | 7/1989 | Hodgdon et al. |
| 4,864,229 A | 9/1989 | Lauks et al. |
| 4,871,431 A | 10/1989 | Parsi |
| 4,888,098 A | 12/1989 | Nyberg et al. |
| 4,900,450 A | 2/1990 | Schmidt |
| 4,913,816 A | 4/1990 | Waite |
| 4,925,541 A | 5/1990 | Giuffrida et al. |
| 4,940,667 A | 7/1990 | Goldstein et al. |
| 4,969,983 A | 11/1990 | Parsi |
| 4,970,003 A | 11/1990 | Rak |
| 4,977,094 A | 12/1990 | Goldstein et al. |
| 4,980,056 A | 12/1990 | Norton |
| D313,330 S | 1/1991 | Brusa |
| 4,990,230 A | 2/1991 | Voss et al. |
| 5,006,211 A | 4/1991 | Paleologou et al. |
| 5,007,989 A | 4/1991 | Nyberg et al. |
| 5,019,235 A | 5/1991 | Nyberg et al. |
| 5,026,465 A | 6/1991 | Katz et al. |
| 5,034,124 A | 7/1991 | Kopf |
| 5,037,858 A | 8/1991 | MacDonald |
| 5,045,171 A | 9/1991 | MacDonald |
| 5,045,198 A | 9/1991 | Norton |
| 5,055,170 A | 10/1991 | Saito |
| 5,056,996 A | 10/1991 | Papastavros et al. |
| 5,061,372 A | 10/1991 | Rak |
| 5,066,375 A | 11/1991 | Parsi et al. |
| 5,066,393 A | 11/1991 | Padera et al. |
| 5,073,255 A | 12/1991 | Chili et al. |
| 5,075,011 A | 12/1991 | Waite |
| 5,089,192 A | 2/1992 | Costa |
| D325,740 S | 4/1992 | Loftis |
| 5,102,547 A | 4/1992 | Waite et al. |
| 5,118,424 A | 6/1992 | McRae |
| 5,118,717 A | 6/1992 | Hodgdon et al. |
| 5,120,416 A | 6/1992 | Parsi et al. |
| 5,127,427 A | 7/1992 | Kajpust et al. |
| 5,137,925 A | 8/1992 | Hodgdon |
| 5,141,717 A | 8/1992 | McRae |
| 5,145,618 A | 9/1992 | MacDonald et al. |
| 5,147,553 A | 9/1992 | Waite |
| 5,152,901 A | 10/1992 | Hodgdon |
| 5,160,608 A | 11/1992 | Norton |
| 5,162,649 A | 11/1992 | Burke |
| 5,194,189 A | 3/1993 | Papastavros et al. |
| 5,203,976 A | 4/1993 | Parsi et al. |
| 5,203,982 A | 4/1993 | MacDonald |
| 5,221,455 A * | 6/1993 | Hanada et al. ............... 204/296 |
| 5,227,052 A | 7/1993 | Ilves |
| 5,228,962 A | 7/1993 | Mani et al. |
| 5,239,285 A | 8/1993 | Rak |
| 5,254,257 A | 10/1993 | Brigano et al. |
| 5,264,125 A | 11/1993 | MacDonald et al. |
| 5,273,070 A | 12/1993 | Chili et al. |
| 5,275,206 A | 1/1994 | Acker et al. |
| 5,281,317 A | 1/1994 | Mani et al. |
| 5,282,935 A | 2/1994 | Cawlfield et al. |
| 5,284,879 A | 2/1994 | Hodgdon et al. |
| 5,290,443 A | 3/1994 | Norton |
| 5,298,164 A | 3/1994 | Hapach et al. |
| 5,308,466 A | 5/1994 | Ganzi et al. |
| 5,322,604 A | 6/1994 | Cawlfield |
| 5,354,903 A | 10/1994 | MacDonald |
| 5,384,813 A | 1/1995 | Loftis et al. |
| 5,401,408 A * | 3/1995 | Umemura et al. ............ 204/631 |
| 5,415,759 A | 5/1995 | Cawlfield et al. |
| 5,472,622 A | 12/1995 | Solomon et al. |
| 5,474,653 A | 12/1995 | Bostjancic |
| 5,478,488 A | 12/1995 | Doetsch et al. |
| 5,480,555 A | 1/1996 | Momber |
| 5,503,729 A | 4/1996 | Elyanow et al. |
| 5,510,394 A | 4/1996 | Hodgdon |
| 5,572,414 A | 11/1996 | Komori |
| 5,575,923 A | 11/1996 | Solomon et al. |
| 5,577,890 A | 11/1996 | Nielsen et al. |
| 5,585,003 A | 12/1996 | Van Newenhizen |
| 5,616,249 A | 4/1997 | Hodgdon |
| 5,656,161 A | 8/1997 | Solomon et al. |
| 5,658,459 A | 8/1997 | Guttormsen |
| 5,662,802 A | 9/1997 | Heins et al. |
| 5,665,239 A | 9/1997 | Katzakian, Jr. et al. |
| 5,667,686 A | 9/1997 | Schubert |
| 5,679,228 A | 10/1997 | Elyanow et al. |
| 5,679,229 A | 10/1997 | Goldstein et al. |
| D387,656 S | 12/1997 | Liang |
| 5,693,227 A | 12/1997 | Costa |
| 5,699,272 A | 12/1997 | Zabinski |
| 5,702,582 A | 12/1997 | Goldstein et al. |
| D389,400 S | 1/1998 | Liang |
| 5,730,646 A | 3/1998 | Watkin |
| 5,738,170 A | 4/1998 | Lavernhe |
| 5,738,780 A | 4/1998 | Markham |
| D394,697 S | 5/1998 | Liang |
| 5,751,598 A | 5/1998 | Zabinski et al. |
| 5,759,412 A | 6/1998 | McDougald |
| 5,762,774 A | 6/1998 | Tessier |
| 5,766,488 A | 6/1998 | Uban et al. |
| 5,770,037 A | 6/1998 | Goto et al. |
| 5,788,826 A | 8/1998 | Nyberg |
| 5,798,040 A | 8/1998 | Liang |
| D398,368 S | 9/1998 | Schroer |
| 5,800,705 A | 9/1998 | Downs |
| 5,814,197 A | 9/1998 | Batchelder et al. |
| 5,833,846 A | 11/1998 | Tanabe et al. |
| 5,833,867 A | 11/1998 | Hensley |
| 5,858,191 A | 1/1999 | DiMascio et al. |
| 5,863,438 A | 1/1999 | Katzakian, Jr. et al. |
| 5,868,915 A | 2/1999 | Ganzi et al. |
| 5,881,809 A | 3/1999 | Gillespie et al. |
| 5,885,141 A | 3/1999 | Watkin |
| 5,885,458 A | 3/1999 | Wilcher et al. |
| 5,888,381 A | 3/1999 | Primdahl et al. |
| 5,891,328 A | 4/1999 | Goldstein |
| 5,895,570 A | 4/1999 | Liang |
| 5,897,757 A | 4/1999 | Sano |
| 5,906,436 A | 5/1999 | Cole et al. |
| 5,919,357 A | 7/1999 | Wilkins et al. |
| 5,922,209 A | 7/1999 | Yoshida et al. |
| 5,925,240 A | 7/1999 | Wilkins et al. |
| 5,931,194 A | 8/1999 | Raque et al. |
| 5,931,196 A | 8/1999 | Bernardi et al. |
| 5,934,971 A | 8/1999 | Thompson et al. |
| 5,948,230 A | 9/1999 | McRae |
| 5,957,669 A | 9/1999 | Parikh et al. |
| 5,979,551 A | 11/1999 | Uban et al. |
| 6,004,438 A | 12/1999 | Woodson |

| | | | | | | |
|---|---|---|---|---|---|---|
| 6,009,136 A | 12/1999 | Loftis et al. | | 6,514,398 B2 | 2/2003 | DiMascio et al. |
| 6,019,892 A | 2/2000 | Wilcher | | 6,524,469 B1 | 2/2003 | Schucker |
| 6,027,645 A | 2/2000 | Biskner et al. | | 6,536,606 B2 | 3/2003 | Schneider et al. |
| 6,030,529 A | 2/2000 | Biskner et al. | | 6,546,685 B2 | 4/2003 | Nordland et al. |
| 6,032,821 A | 3/2000 | Martin et al. | | 6,568,282 B1 | 5/2003 | Ganzi |
| 6,047,768 A | 4/2000 | Buehler, III | | 6,572,758 B2 | 6/2003 | Zolotarsky et al. |
| 6,051,131 A | 4/2000 | Maxson | | 6,575,195 B2 | 6/2003 | Wichmann |
| 6,068,450 A | 5/2000 | Parikh et al. | | 6,579,450 B2 | 6/2003 | Wilcher |
| 6,074,551 A | 6/2000 | Jones et al. | | 6,582,605 B2 | 6/2003 | Krulik et al. |
| 6,076,543 A | 6/2000 | Johnson | | 6,592,762 B2 | 7/2003 | Smith |
| 6,086,757 A | 7/2000 | Wilcher | | 6,607,175 B1 | 8/2003 | Nguyen et al. |
| 6,093,329 A | 7/2000 | McDougald | | 6,607,647 B2 | 8/2003 | Wilkins et al. |
| 6,103,078 A * | 8/2000 | Hitchems et al. ............. 204/296 | | 6,613,230 B2 | 9/2003 | Krulik et al. |
| 6,105,598 A | 8/2000 | Cabrera et al. | | 6,620,315 B2 | 9/2003 | Martin |
| 6,109,778 A | 8/2000 | Wilmer | | 6,623,647 B2 | 9/2003 | Martin |
| 6,110,342 A | 8/2000 | Mani | | 6,638,413 B1 | 10/2003 | Weinberg et al. |
| 6,110,385 A | 8/2000 | Copa et al. | | 6,645,385 B2 | 11/2003 | Krulik et al. |
| 6,117,297 A | 9/2000 | Goldstein | | 6,645,400 B2 | 11/2003 | Martin |
| 6,126,516 A | 10/2000 | Barrier et al. | | 6,649,037 B2 | 11/2003 | Liang et al. |
| 6,126,796 A | 10/2000 | Shimamune et al. | | 6,652,758 B2 | 11/2003 | Krulik |
| 6,126,805 A | 10/2000 | Batchelder et al. | | 6,659,113 B2 | 12/2003 | Wilcher |
| 6,132,176 A | 10/2000 | Higgins | | 6,660,307 B2 | 12/2003 | Zolotarsky et al. |
| 6,139,714 A | 10/2000 | Livshits | | 6,674,249 B1 | 1/2004 | Leskovec |
| 6,143,184 A | 11/2000 | Martin et al. | | 6,693,139 B2 | 2/2004 | Bachman et al. |
| 6,146,538 A | 11/2000 | Martin | | 6,709,578 B2 | 3/2004 | Wilcher |
| 6,149,819 A | 11/2000 | Martin et al. | | 6,716,359 B1 | 4/2004 | Dennis, II |
| 6,153,105 A | 11/2000 | Tadlock et al. | | 6,723,246 B2 | 4/2004 | Krulik |
| 6,176,258 B1 | 1/2001 | Bernardi | | 6,726,893 B2 | 4/2004 | Lee et al. |
| 6,180,002 B1 | 1/2001 | Higgins | | 6,733,636 B1 | 5/2004 | Heins |
| 6,190,564 B1 | 2/2001 | Lehmann et al. | | 6,736,275 B2 | 5/2004 | Schneider et al. |
| 6,206,091 B1 | 3/2001 | Buehler | | 6,740,235 B2 | 5/2004 | Gill |
| 6,206,200 B1 | 3/2001 | Gilles et al. | | 6,763,846 B2 | 7/2004 | Haruch |
| 6,217,729 B1 | 4/2001 | Zolotarsky et al. | | 7,087,211 B2 | 8/2006 | Balachandran et al. |
| 6,221,248 B1 | 4/2001 | Lin et al. | | 7,163,964 B2 * | 1/2007 | Chidambaran et al. ......... 521/25 |
| 6,244,574 B1 | 6/2001 | Downs | | 7,338,590 B1 | 3/2008 | Shelnutt et al. |
| 6,263,900 B1 | 7/2001 | Cabrera et al. | | 7,344,629 B2 | 3/2008 | Holmes et al. |
| 6,267,855 B1 | 7/2001 | Watanabe et al. | | 2001/0035218 A1 | 11/2001 | Ibanez |
| 6,270,671 B1 | 8/2001 | Shorr et al. | | 2002/0172871 A1 | 11/2002 | Schucker |
| 6,273,937 B1 | 8/2001 | Schucker | | 2003/0019790 A1 | 1/2003 | Schucker |
| 6,280,601 B1 | 8/2001 | Doring | | 2003/0019818 A1 | 1/2003 | Carson et al. |
| 6,284,124 B1 | 9/2001 | DiMascio et al. | | 2003/0041908 A1 | 3/2003 | Scanlan et al. |
| 6,293,975 B1 | 9/2001 | Scalliet et al. | | 2003/0116430 A1 | 6/2003 | Kurokawa et al. |
| 6,305,555 B1 | 10/2001 | Wilcher | | 2004/0005719 A2 | 1/2004 | Godec et al. |
| 6,308,724 B1 | 10/2001 | Haruch et al. | | 2004/0027100 A1 | 2/2004 | Xu et al. |
| 6,309,521 B1 | 10/2001 | Andrews et al. | | 2004/0108277 A1 | 6/2004 | Krulik |
| 6,312,577 B1 | 11/2001 | Ganzi et al. | | 2006/0016685 A1 | 1/2006 | Hawkins et al. |
| 6,315,886 B1 | 11/2001 | Zappi et al. | | 2006/0137986 A1 | 6/2006 | Holmes et al. |
| 6,315,906 B1 | 11/2001 | Sassaman, Jr. et al. | | 2006/0138997 A1 | 6/2006 | Holmes et al. |
| 6,328,896 B1 | 12/2001 | Atnoor et al. | | 2007/0023290 A1 | 2/2007 | Hawkins et al. |
| 6,337,014 B1 | 1/2002 | Regunathan et al. | | 2007/0108056 A1 | 5/2007 | Nyberg et al. |
| 6,342,163 B1 | 1/2002 | DeLonge et al. | | 2007/0120523 A1 | 5/2007 | Holmes et al. |
| 6,343,752 B1 | 2/2002 | Sleasman et al. | | 2007/0175766 A1 | 8/2007 | Holmes et al. |
| 6,344,584 B2 | 2/2002 | Lin et al. | | | | |
| 6,354,819 B1 | 3/2002 | Parikh et al. | | FOREIGN PATENT DOCUMENTS | | |
| 6,355,157 B1 | 3/2002 | Martin | | DE | 3730419 A1 | 3/1989 |
| 6,358,421 B1 | 3/2002 | Newenhizen et al. | | DE | 3926642 A1 | 3/1990 |
| 6,373,680 B1 | 4/2002 | Riskin | | DE | 43 29 802 A1 | 3/1995 |
| 6,375,851 B1 | 4/2002 | Sterling et al. | | DE | 200 13 926 U1 | 11/2000 |
| D456,876 S | 5/2002 | Zellinger et al. | | DE | 100 13 457 A1 | 9/2001 |
| 6,383,389 B1 | 5/2002 | Pilgram et al. | | DE | 102 17 885 A1 | 11/2003 |
| 6,391,448 B1 | 5/2002 | Geiser | | EP | 0 317 816 A1 | 5/1989 |
| 6,398,965 B1 | 6/2002 | Arba et al. | | EP | 0 537 526 A1 | 4/1993 |
| 6,409,926 B1 | 6/2002 | Martin | | EP | 0 537 562 A1 | 4/1993 |
| 6,410,672 B1 | 6/2002 | MacDonald et al. | | EP | 0 638 664 A1 | 2/1995 |
| 6,419,817 B1 | 7/2002 | Martin | | EP | 0 642 824 | 3/1995 |
| 6,419,823 B2 | 7/2002 | DeLonge et al. | | EP | 1 075 868 | 2/2001 |
| 6,423,234 B1 | 7/2002 | Martin | | EP | 1 150 050 A2 | 10/2001 |
| 6,428,677 B1 | 8/2002 | Bonnick et al. | | EP | 1 172 145 A | 1/2002 |
| 6,434,024 B2 | 8/2002 | Shirato | | FR | 2 803 284 A1 | 6/2001 |
| 6,440,310 B1 | 8/2002 | Shorr et al. | | GB | 1 289 738 A | 9/1972 |
| 6,457,698 B2 | 10/2002 | Wichmann | | GB | 1 551 538 | 8/1979 |
| 6,464,211 B1 | 10/2002 | Downs | | JP | 49-023773 | 3/1974 |
| 6,468,412 B2 | 10/2002 | Bryan et al. | | JP | 06-079278 | 3/1994 |
| 6,472,223 B1 | 10/2002 | Stannard et al. | | JP | 07-136653 | 5/1995 |
| 6,482,305 B1 | 11/2002 | Mani | | JP | 09-138207 | 5/1997 |
| 6,485,641 B1 | 11/2002 | McLeod | | JP | 10-085746 | 4/1998 |
| 6,491,181 B1 | 12/2002 | Martin et al. | | JP | 10-216723 | 8/1998 |
| 6,497,817 B1 | 12/2002 | Liang | | JP | 2000-202449 | 7/2000 |
| 6,510,959 B1 | 1/2003 | Van Newenhizen | | JP | 2001-259634 | 9/2001 |

| | | | |
|---|---|---|---|
| SU | 874090 A | 10/1981 |
| WO | WO-93/20929 A1 | 10/1993 |
| WO | WO-98/32525 | 7/1998 |
| WO | WO-99/28240 | 6/1999 |
| WO | WO-02/14224 A1 | 2/2002 |
| WO | WO-02/079098 | 10/2002 |
| WO | WO 02/079098 A1 | 10/2002 |
| WO | WO 03/020404 A3 | 3/2003 |
| WO | WO-2005/009596 A1 | 2/2005 |
| WO | WO-2005/016831 A1 | 2/2005 |
| WO | WO-2006/015034 A3 | 7/2006 |
| WO | WO-2006/071513 A3 | 7/2006 |
| WO | WO-2006/071533 A1 | 7/2006 |
| WO | WO-2007/044609 A1 | 4/2007 |

OTHER PUBLICATIONS

Webster's Ninth New Collegiate Dictionary, © 1991 by Merriam-Webster Inc., p. 283 ("contiguous").

U.S. Patent Application entitled, "Selectable Ion Concentrations With Electrolytic Ion Exchange"; filed Aug. 8, 2003; U.S. Appl. No. 10/637,186; Inventors: Holmes, et al.

Office Action dated Jun. 27, 2008 (Chinese Patent Office) in CN Patent App. No. 200580025400.7 entitled "Electrochemical ion exchange with textured membranes and cartridge", China.

Office Action dated Jun. 15, 2009 (Chinese Patent Office) in CN Patent App. No. 200580025400.7 entitled "Electrochemical ion exchange with textured membranes and cartridge", China.

Office Action dated Feb. 5, 2009 (European Patent Office) in EP Patent App. No. 05775536.5 entitled "Electrochemical ion exchange with textured membranes and cartridge", Europe.

Office Action dated Dec. 30, 2008 in U.S. Appl. No. 11/190,802, entitled "Electrochemical ion exchange with textured membranes and cartridge".

Final Office Action dated Jul. 23, 2009 in U.S. Appl. No. 11/190,802, entitled "Electrochemical ion exchange with textured membranes and cartridge".

* cited by examiner

US 7,959,780 B2

TEXTURED ION EXCHANGE MEMBRANES

BACKGROUND

Embodiments of the invention relate to ion exchange membranes and related processes and systems.

Ion exchange cells are used to remove or replace ions in solutions, for example in the production of high purity water by deionization, in waste water treatment, and in the selective substitution of ions in solution. Ion exchange materials include cation and anion exchange materials that contain replaceable ions or which chemically react with specific ions, to exchange cations or anions, respectively, from a solution stream. A typical conventional ion exchange cell comprises ion exchange resin beads packed into columns and a stream of solution to be treated is passed through the column. Ions in the solution are removed or replaced by the ion exchange material, and product solution or waste emerges from the outlet of the column. When the ion exchange material is-overwhelmed with ions from the solution, the beads are regenerated with a suitable solution. Cation exchange resins are commonly regenerated using acidic solutions or salt brine (eg. for water softeners), and anion exchange resins are most often regenerated with basic solutions or brine.

Another type of ion exchange uses a water-splitting ion exchange membrane (also known as a bipolar, double, or laminar membrane) positioned between two facing electrodes with a dielectric spacer between the membranes, as for example, described in commonly assigned U.S. Pat. No. 5,788,826 (Nyberg) which is incorporated herein by reference in its entirety. The water splitting membranes have both a cation exchange layer and an anion exchange layer. When a sufficiently high electric field is applied through the membrane by applying a voltage to the two electrodes, water is irreversibly dissociated or "split" into component ions $H^+$ and $OH^-$ at the boundary between the cation and anion exchange layers. The resultant $H^+$ and $OH^-$ ions migrate and diffuse through the ion exchange layers in the direction of the electrode having an opposite polarity (eg. $H^+$ migrates to the negative electrode). During the regeneration step, the $H^{30}$ and $OH^-$ ions formed at the membrane interface cause the rejection of cations and anions removed in a previous deionization step, reforming the acid and base forms of the cation and anion exchange materials. Electrical regeneration in this way avoids the use, and subsequent disposal problems, of hazardous chemicals that are used to regenerate conventional ion exchange beads.

The ion exchange membranes of the prior art are typically smooth and flat, and also often have a uniform cross-sectional thickness, to minimize variations in current densities across the membranes in electrochemical cells. Also a separate dielectric spacer, such as a plastic netting material, is typically placed between the membranes to maintain the membranes at a uniform distance from one another to further reduce current density variation and maintain consistent mass transport rates and pressure drops across the gap between the membranes. The membrane thickness is maintained uniform to provide a constant spacing between ion exchange membranes to generate uniform current densities across membrane surfaces. Various methods can be used to maintain a uniform thickness on the membrane. The membrane should also be flat and smooth to facilitate the backwashing of ion exchange resins in electrodeionization devices, and well as the periodic replacement of these resins. Membranes have a smooth flat surface also reduces the pressure drop between adjacent membranes. However, conventional ion exchange membranes generally provide slower ion exchange rates and consequently, slower solution treatment flow rates and outputs, than conventional ion exchange bead systems. Consequently, the membrane systems have limited utility due to space volume versus solution treatment throughout considerations.

Furthermore, the dielectric spacer layers that are used to separate the membranes in the electrochemical cells have to be sufficiently thick to be free-standing and structurally sound to withstand handling when inserted between the membranes in the fabrication of a cell. Typically, the spacer layers are fabricated from polymer, such as polyethylene or polypropylene, and can have a regular pattern. A typical thickness of the spacer layer is from about 0.25 to about 1 mm (10 to 40 mils). Spacer layers thinner than 0.25 mm are difficult to handle and can result in stretching of spacer strands, tearing or creasing, in the assembly of cells, and they are also generally more expensive and difficult to make. A further problem in attempting to reduce spacer thickness arises because the pressure of the solution passed through the cell needs to be increased to deliver the same solution flow rate. Thus, generally, relatively thick spacer layers are used in the electrochemical cell, further increasing the bulk volume of the cell and reducing solution treatment output per unit volume of cell space.

Thus, it is desirable to have an electrochemical ion exchange cell capable of providing better ion exchange rates. It is also desirable to have a water-splitting membrane and spacer that exhibits sufficient strength for handling and use and which is not excessively thick. It is further desirable to limit the number of steps needed to manufacture such cells, reduce the number of parts for assembly, and reduce assembly errors.

SUMMARY

A textured water-splitting membrane comprises an anion exchange layer abutting a cation exchange layer to form a heterogeneous water-splitting interface therebetween and a textured surface having a pattern of texture features comprising spaced apart peaks and valleys.

The membrane may also comprise an integral spacer on the textured surface. The integral spacer can be composed of a dielectric material, such as filaments, which are embedded in a polymer matrix that is directly bonded to the crowns of the spaced apart peaks of the membrane.

A cartridge for an ion exchanging electrochemical cell comprises a plurality of textured membranes abutting one another, each membrane having (i) an anion exchange layer abutting a cation exchange layer to form a heterogeneous water-splitting interface therebetween, and (ii) a textured surface having a pattern of texture features comprising spaced apart peaks and valleys. The membranes of the cartridge can also have the integral spacer.

An electrochemical cell for removing or exchanging ions from a solution stream comprises the cartridge, and also has a housing with first and second electrodes about the cartridge. The electrochemical cell can be used in an electrochemical ion exchange system that also has a voltage supply for supplying a voltage to the first and second electrodes and a pump for flowing a solution stream through the electrochemical cell.

DRAWINGS

DESCRIPTION

Figure 1A:
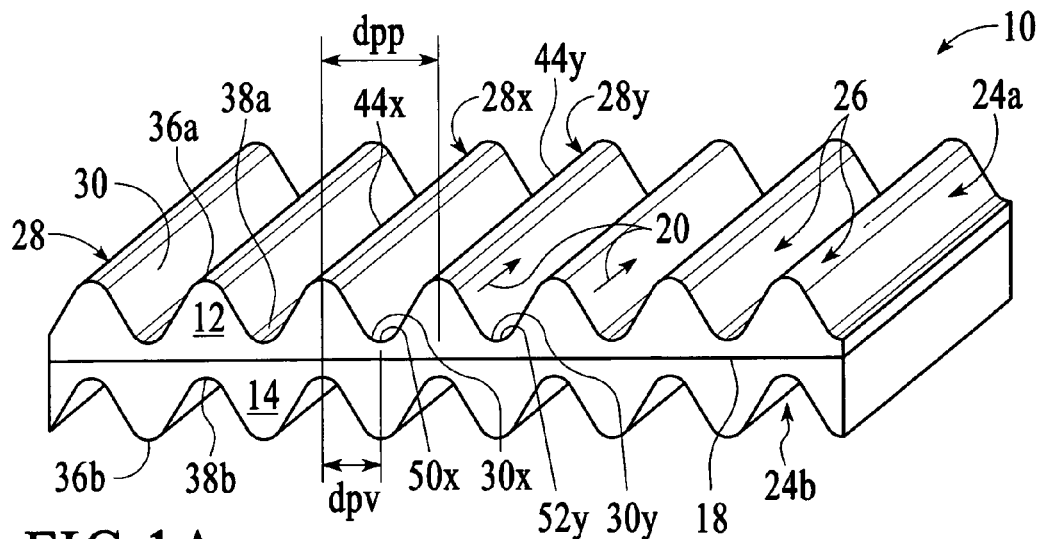
FIG. 1A is a schematic perspective view of a textured, water-splitting, ion exchange membrane with texture features that are a pattern of peaks and depressions and having an aspect ratio of approximately 1.

An exemplary embodiment of a textured water-splitting membrane 10 (also known as a bipolar, double, or laminar membrane) is shown in FIG. 1. The membrane 10 comprises an anion exchange layer 12 abutting a cation exchange layer 14 to form a heterogeneous water-splitting interface 18. The anion and cation exchange layers 12, 14 contain anion and cation exchange materials, respectively, typically in the form of solids or gels containing ions which are replaceable by other ions or which chemically react with specific ions to remove the ions from a solution stream 20. For example, suitable cation and anion exchange materials can include crosslinked or un-crosslinked organic polymers or inorganic structures such as zeolites. Anion exchange materials exchange anions with no permanent change to their structure, and can be for example, basic groups. Other suitable anion exchange materials can include comprise one or more basic functional groups capable of exchanging anions such as —NR$_3$A, —NR$_2$HA, —PR$_3$A, —SR$_2$A, or C$_5$H$_5$NHA (pyridine), where R is an alkyl, aryl, or other organic group and A is an anion (e.g., hydroxide, bicarbonate, chloride, or sulfate ion). Cation exchange materials exchange cations with no permanent change to the structure of the material, and can include, for example, acidic groups. Suitable cation exchange materials can comprise one or more acidic functional groups capable of exchanging cations such as —COOM, —SO$_3$M, —PO$_3$M$_2$, and —C$_6$H$_4$OM, where M is a cation (e.g., hydrogen, sodium, calcium, or copper ion). Cation exchange materials also include those comprising neutral groups or ligands that bind cations through coordinate rather than electrostatic or ionic bonds (for example pyridine, phosphine and sulfide groups), and groups comprising complexing or chelating groups (e.g., those derived from aminophosphoric acid, aminocarboxylic acid, and hydroxamic acid The selection of suitable cation and anion exchange materials for an ion exchange membrane 10 depends on the application of the membrane. For example, in the deionization of a water based solution stream, a membrane 10 comprising an anion exchange layer 12 having —NR$_3$A groups such as triethyl ammonium (—N(C$_2$H$_5$)$_3$ groups, and cation exchange layers 14 comprising —SO$_3$M or carboxylic acid (—COOH) groups is preferred. Such membranes readily swell in water, thereby providing lower electrical resistances and higher mass transport rates over a wide range of pH. Anion exchange materials comprising weak base or weak acid groups are preferred when particularly efficient ion exchange regeneration is required. For example, —NR$_2$HA will react with OH$^-$ in a very favorable reaction to form —NR$_2$, H$_2$O, and expel A$^-$. As another example, for the selective removal of calcium or copper ions from a liquid containing other ions, for example sodium ion, ion exchange groups such as —COOM or a chelating group such as aminocarboxylic acid are preferred. These weak acid groups offer the additional benefit of particularly efficient regeneration due to the strongly favorable reaction of —(COO)$_n$M with H$^+$ to form —COOH and expel M$^{+n}$, where M is a metal ion.

The textured membrane 10 comprises at least one exposed surface 24 having texture features 26 comprising a pattern of repeating three-dimensional shapes, such as an array peaks 28 and valleys 30, exemplary embodiments of which are shown in FIGS. 1-5. The texture features 26 generally have dimensions that on the order of microns or greater as explained below, and are not sized in sub-micron ranges. In one version, the texture features 26 comprise peaks 28 shaped like ridges 36a,b which are spaced apart and parallel to a flow path of the solution stream 20, and valleys 30 comprising furrows 38a,b that lie between adjacent ridges 36, as shown in FIGS. 1A to 1D.

Figure 1B:
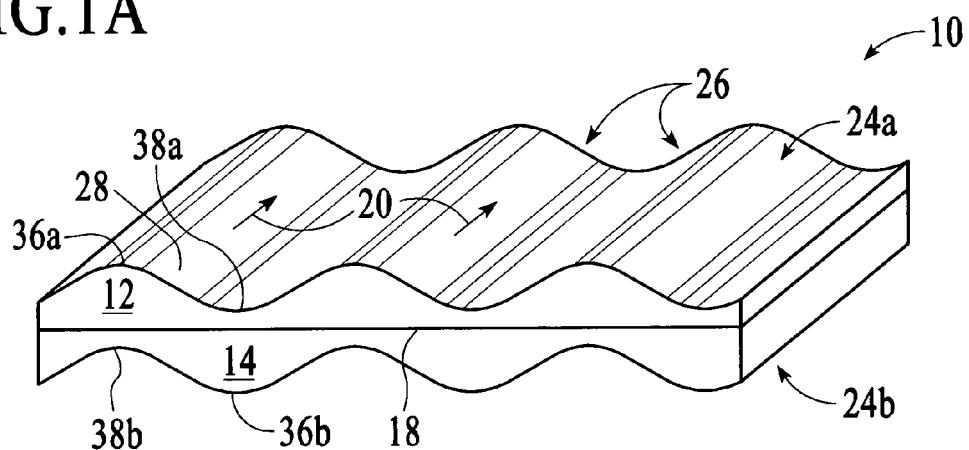
FIG. 1B is a schematic perspective view of another embodiment of the ion exchange membrane of FIG. 1A in which the aspect ratio is approximately 0.5.

In another version, as shown in FIG. 1B, the ridges 36a,b and furrows 38a,b are positioned on both sides of the membrane 10 such that a ridge 36a on one side (or layer) of the membrane 10 lies generally opposite a furrow 38a on the other side (or layer) of the membrane 10. This arrangement is better for providing more uniform current density and hence better utilization of ion exchange capacity.

Figure 1C:
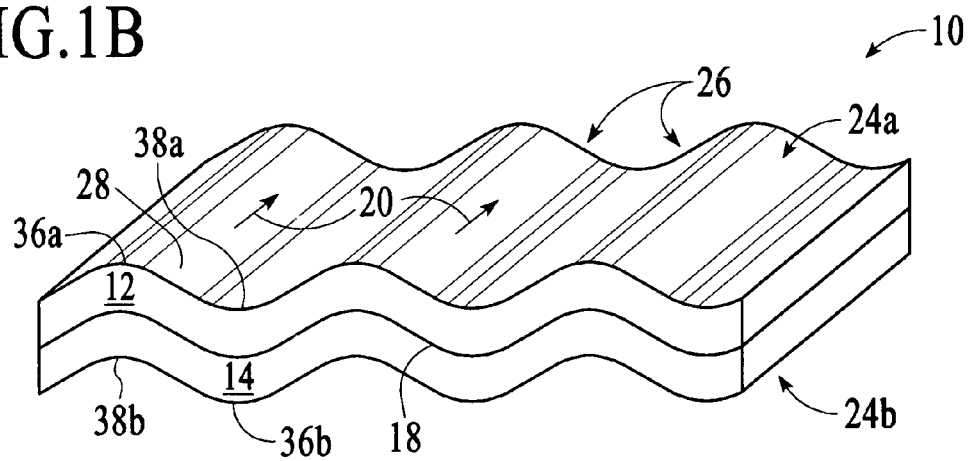
FIG. 1C is a schematic perspective view of another embodiment of the ion exchange membrane of FIG. 1A in which the boundary between the anion and cation exchange layers follows the contour of the textured surfaces to form a corrugated layer.

In a third version, the entire membrane 10 undulates with a furrow 38a on the first surface 24a following the contour of a ridge 36b on the second surface 24b of the membrane 10, and a ridge 36a on the first surface 24a similarly following the contour of the furrow 38b on the second surface 24b of the membrane 10. Such a version, as shown in FIG. 1C, provides a corrugated membrane 10 in which corrugation is obtained from rows of ridges 28 running in the direction of the solution stream 20 on both opposing sides of the membrane 10, that is the peaks 28a on one side of the membrane 10 lie opposite the valleys 30b on the other side of the membrane 10. The corrugated membrane 10 provides a uniform distance across anion and cation exchange layers 12,14, respectively, in contrast to other membrane designs that can provide thin and thick anion and/or cation layers as illustrated in 1B. This provides still more uniform current densities and ion exchange capacity utilization. Other arrangements of the ridges 36a,b and furrows 38a,b can also be used, for example, with the ridges 36a and furrows 38a on one surface 24a asymmetrical to the ridges 36b and furrows 38b on the other surface 24b, such that they are generally non-parallel or even perpendicular to one another (not shown).

Figure 1D:
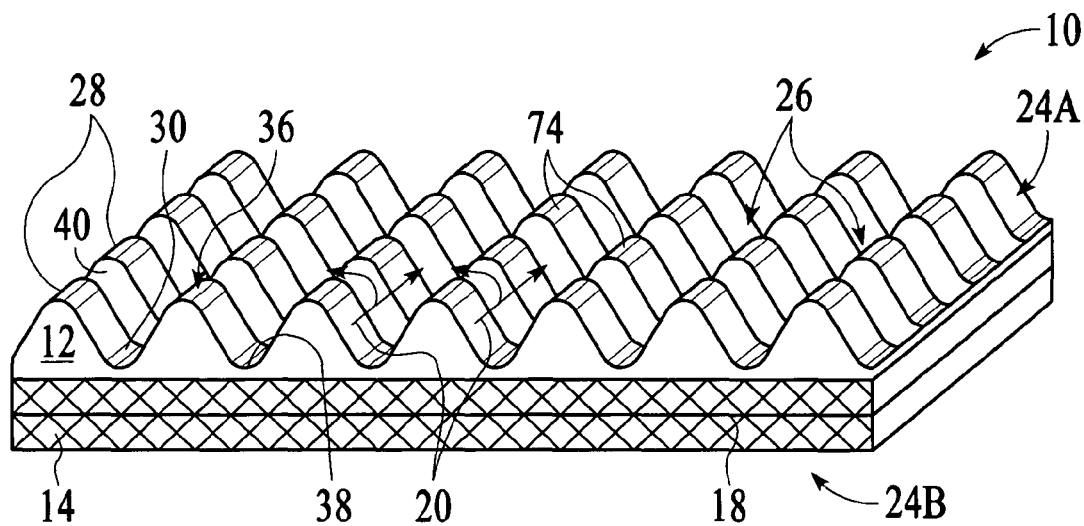
FIG. 1D is a schematic perspective view of another embodiment of the ion exchange membrane of FIG. 1A in which channels are cut across ridges and furrows.
Figure 1E:
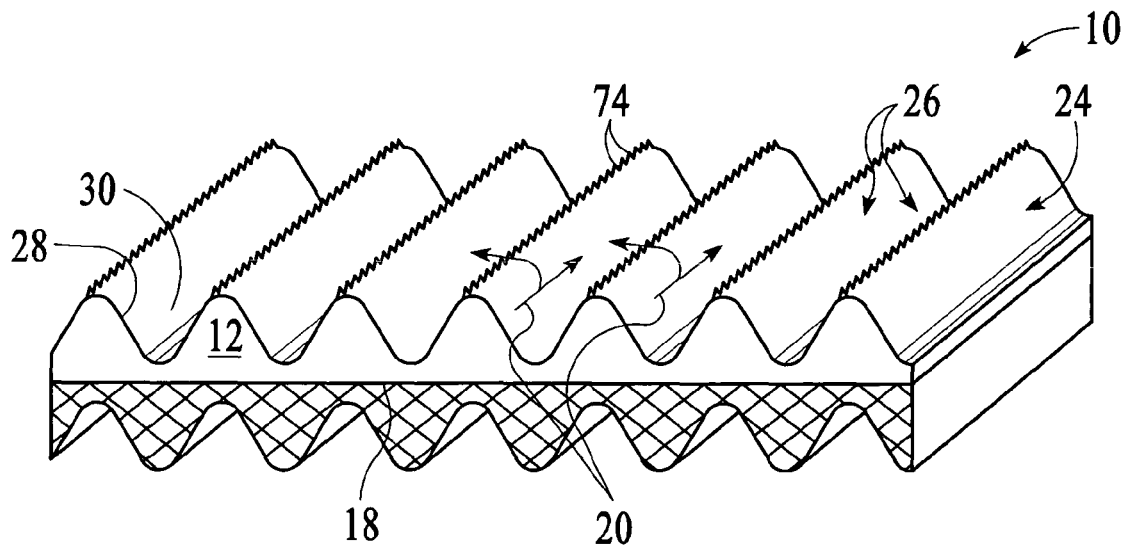
FIG. 1E is a schematic perspective view of another embodiment of the ion exchange membrane of FIG. 1A showing a dielectric coating on the ridges.

It may also be useful to texture only one side of a water-splitting membrane 10, in order to, for example, increase the extraction of either cations or anions. The ridges 36a,b and furrows 38a,b can be on both surfaces 24a,b or layers 12,14 of the membrane 10 (as shown in FIGS. 1A to 1C) or only on one surface 24, as shown in FIG. 1D. In this version, the surface 24a formed from the anion layer 12 has the ridges 36 and furrows 38, while the other surface 24b is flat. FIG. 1D also shows a further embodiment of the membrane 10 in which the parallel ridges 36 have channels 40 cutting across the ridges 36. The channels 40 are oriented along a different direction than the orientation of the ridges 36 (or furrows 38) to promote turbulence and/or increase surface area. For example, the channels 40 can be oriented generally perpendicular to the orientation of the ridges 36 and furrows 38 so that they define additional passages that traverse the direction of flow of the solution stream 20 across the membrane 10. The channels 40 can also be oriented at any angular direction relative to that of the ridges 36 or furrows 38.

Figure 2:
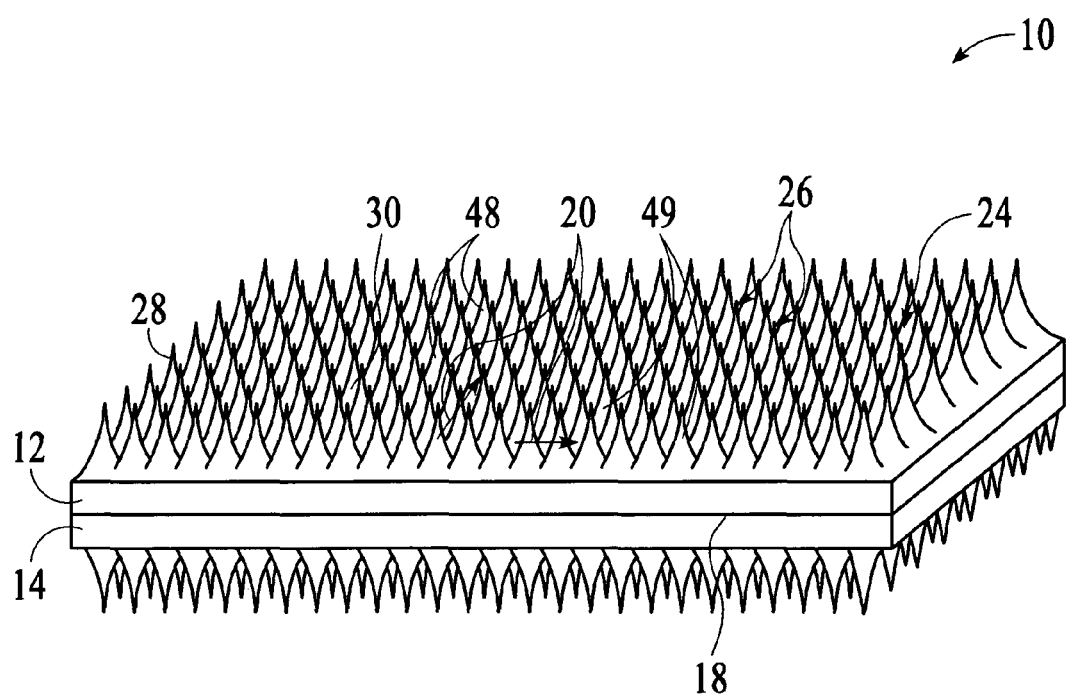
FIG. 2 is a schematic perspective view of another embodiment of the ion exchange membrane having texture features comprising conical protrusions that extend from a flat surface.

The peaks 28 and valleys 30 of the texture features 26 can also be other structures other than ridges 36 and furrows 38. For example, the peaks 28 can comprise conical protrusions 48 that extend out from an otherwise substantially flat surface region 49 which defines the valleys 30 between the peaks 28, as shown in FIG. 2. In this version, the conical protrusions 48 are randomly spaced apart and distributed across the membrane surface. The conical protrusions 48 create a turbulent convoluted flow of the solution stream 20 across the exposed surface 24 of the membrane 10, which increases the residence time of the solution stream 20 on the membrane 10. The conical protrusions 48 may be formed by abrasion, foaming, embossing, or any other suitable means. Instead of a conical shape, the conical protrusions 48 can also have other shapes and dimensions.

Figure 3:
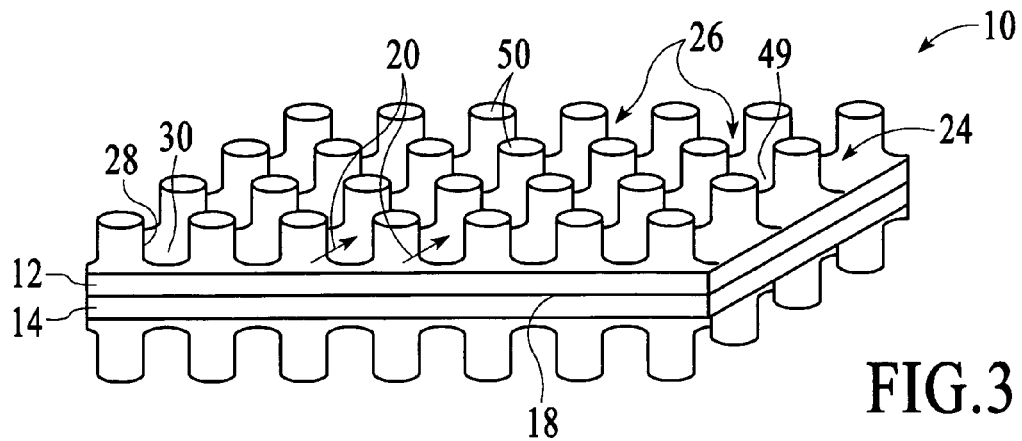
FIG. 3 is a schematic perspective view of another embodiment of the ion exchange membrane having texture features comprising mesas that extend out from a flat surface.

In yet another version, the membrane 10 comprises texture features 26 comprising peaks 28 shaped like mesas 50 that extend out of an otherwise substantially flat surface region 49 which defines the valleys 30 between the peaks 28, as shown in FIG. 3. The mesas 50 have a flat cut-off top and are generally cylindrical with a rounded bottom edge. The mesas 50 can be formed, for example, impressing a mesh screen having a pattern of round holes into a freshly formed membrane sheet by a press, such as a hydraulic press, or by running a membrane sheet through rollers having a pattern of holes therein. This version is particularly useful when the solution stream has a large amount of dissolved solids that would otherwise get entrapped into the fine holes and spaces between other types of texture features 26.

It is believed that the texture features 26 on the exposed surface 24 of the membrane 10 can increase mass transport of ions between membrane 10 and solution stream 20, and can also serve to separate the membranes from one another while still allowing solution to flow between membranes through texture valleys. In explaining the effects of texture on the exposed surface 24 of the membrane 10, it is beneficial to distinguish between geometric area, surface area, and surface roughness. Geometric area is the area measured with a ruler when a membrane 10 is laid out flat on a planar surface. Surface area is measured on a scale that increases mass transport of species, e.g. ions, from solution to the membrane surface. The texture features 26 are provided to increase the surface area for a given geometric area. The size of the texture features 26 which must be considered in measuring surface area is determined by the solution stagnant layer thickness which is typically greater than one micron as described below.

Surface roughness refers to micro-texture features 42, as described below, which are generally sub-micron sized features that are smaller than the solution stagnant layer thickness, and hence do not substantially influence mass transport rates from solution to the membrane 10.

Thus, as certain dimensions of texture features 26 increase, the surface area of the exposed surface 24 of the membrane 10 also proportionately increases. If the dimensions of the textured features 26 are greater than the stagnant layer thickness, mass transport rates into and out of the membrane 10 will increase. The mass transport from a solution to a membrane 10 or other surface is proportional to the surface area of the stagnant layer. At the boundary between a surface and a stirred or flowing solution there is a layer of solution, the stagnant layer, which is flowing or stirring at a significantly slower rate than the bulk solution stream. The rate of flow is described in terms of solution velocity that decreases as one nears the stagnant layer from within the bulk solution, and this velocity is zero at the surface. Because the solution velocity is a smooth continuous function from the edge of the bulk solution to the immobile surface, the stagnant layer thickness can be mathematically defined as the distance from the surface at which the solution speed increases to 99% of the bulk or freestream solution speed:

$$\text{Stagnant Layer Thickness, } \delta \cong 5/\sqrt{Re_x} \qquad (2)$$

where Re is the Reynolds number of the solution in the channel, and viscous flow dominates when Re is small ($\leq 2000$) and turbulent flow dominates when Re is large ($\geq 2000$). When the dimensions of the texture features 26 are larger than the stagnant layer thickness $\delta$, the stagnant layer begins to follow the contour of the features 26 on the exposed surface 24 of the membrane 10, and thus, the surface area of the stagnant layer increases with increasing membrane surface area. When the texture features 26 have dimensions smaller than the stagnant layer thickness $\delta$, the stagnant layer is essentially flat on the surface 24 of the membrane 10 to have a reduced surface area. Thus, for a given geometric area, faster mass transport into and out of the cation and anion exchange layers 12, 14 of the membrane 10 results from increasing the effective area of the stagnant layer by the use of features that have dimensions greater than the stagnant layer thickness $\delta$. The textured membrane 10 then has an effective surface area for mass transport that includes the larger area resulting from the convoluted topography of the textured features 26. For the typical solution velocities of a solution stream passing across the surface 24 of a membrane 10, the stagnant layer thickness, $\delta$, is usually about 1 micron or larger, with the layer thickness $\delta$ increasing as the flow rate of the solution stream decreases. Thus, a suitable dimension of the texture features 26 of the membrane 10 should be at least about 1 micron, and more typically at least about 10 microns.

As illustrated by the exemplary embodiments described above, the texture features 26 have different shapes depending on their application, that can include for example, peaks 28 that are shaped as ridges 36, conical protrusions 48, or mesas 50; and valleys 30 formed by furrows 38, grooves 46 or flat surface regions 49. The dimensions of these peaks 28 and valleys 30 can be appropriately described by, for example, peak heights or valley depths, the distance $d_{p,v}$ (peak to valley) which would be the distance from the crown 44 of a peak 28 to the base 52 of a valley 30, or $d_{pp}$ (peak to peak) which would be the distance from one peak 28a to an adjacent peak 28b. Referring to FIG. 2, the crowns 44 of the peaks 28 are those portions of the peaks that are furthest from the water splitting interface 18 between the two ion exchange layers 12, 14 of the membrane 10, and the base 52 of the valleys 30 are those portions of the valleys that are closest to the interface 18. The absolute dimensions selected depends on the application, since thinner membranes 10 with texture features 26 having smaller dimensions provide greater surface area in a given volume of a cell, but may exhibit excessive pressure drops due to the small channels available for flow of the solution stream between the features 26. In one version, the texture features 26 comprise a distance $d_{pv}$ of at least about 10 microns or more preferably at least about 100 microns; and the distance $d_{pp}$ can be at least about 10 microns or more preferably at least about 100 microns.

The texture features 26 of the membranes 10 can also be defined by an aspect ratio that depends on the balance of properties desired for an electrochemical cell. Thus:

$$\text{Texture Feature Aspect Ratio} = d_{pv}/d_{pp} \quad (1)$$

In Equation 1, $d_{pv}$ (distance peak to valley) refers to the average distance from a crown 44x of a peak 28x to a base 52x of an adjacent valley 30x; and $d_{pp}$ (distance peak to peak) refers to average distances between the crowns 44x,y of the adjacent peaks 44x,y. For any given type of texture feature 26, such as the ridges, furrows, grooves, channels, or protrusions, the aspect ratios can be estimated from average values for $d_{pv}$ and $d_{pp}$. The surface area of the membrane increases as the texture feature aspect ratio increases. A suitable ratio of $d_{pv}/d_{pp}$ is at least about 0.10, more preferably at least 0.5, and most preferably at least 1.0. Excessively high aspect ratios may provide a textured membrane 10 that folds or buckles during assembly of the cell or high solution pressures and are thus undesirable.

Figure 5:
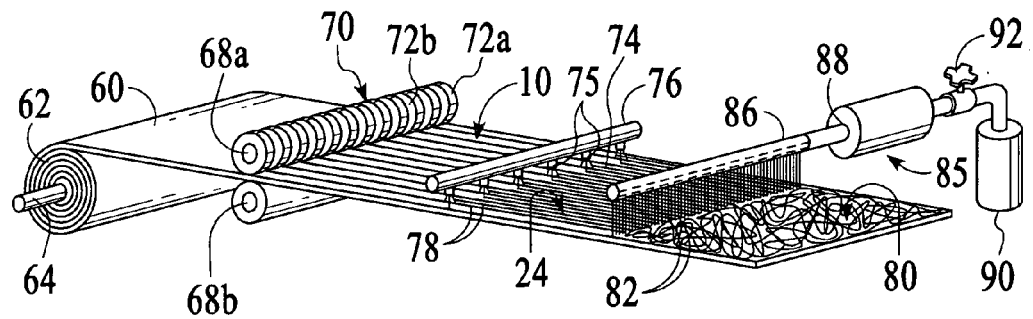
FIG. 5 is a schematic perspective view of an apparatus for forming the textured membrane.

A variety of methods may be used to fabricate the texture features 26 on the water-splitting membrane 10. The selected fabrication method can depend upon the shape, dimensions, and spacing of the texture features 26. For example, texture features 26 comprising peaks 28 that are shaped as parallel and spaced apart ridges 36 and valleys 30 shaped as furrows 38 between the ridges 36, as shown in FIG. 1A, can be formed by passing an un-textured smooth membrane sheet 60 that is mounted as a roll 62 on a roller 64, through a pair of rollers 68a,b, where at least one roller 68a has a imprinted roller surface 70 that is imprinted with the a desired pattern of circumferential raised portions 72a and circumferential troughs 72b that correspond to the ridges 36 and furrows 38, as shown in FIG. 5. When the smooth membrane sheet 60 passes through the pair of rollers 68a,b, the imprinted pattern on the roller surface 70 is embossed on the surface of the smooth membrane sheet 60 that is in contact with the imprinted roller surface 70 to form a textured membrane 10 having a corresponding pattern of ridges 36 and furrows 38. Other methods of forming the membrane 10 including, for example, forming a pattern of mesas 50, as shown in FIG. 3, by thermoforming by compression the desired texture pattern on a smooth membrane sheet 60 between plates or rollers. The pattern of conical protrusions 48 can be formed by sandblasting the membrane sheet 60, abrading the membrane sheet 60 with a stiff brush, or introducing open pores into the material of the membrane sheet 60 using foaming agents. Other methods capable of forming the texture features 26 on the membrane 10 having peak-valley and peak-peak dimensions greater than the stagnant layer thickness, for example, about 1 micron, are also suitable.

In another version, micro-texture features 42 are superimposed on top of the macro texture features 26, for example, fine grooves 74 that are abraded or scratched onto the peaks 28, as shown in FIG. 1D. In the version shown, the fine grooves 74 are formed as a secondary pressed pattern onto the entire surface of the peaks 28. When the micro-texture dimensions are greater than the stagnant layer thickness, this increases mass transport rates. Micro-texture features 42 comprising fine grooves 74 that are abrasion marks can be formed on the membrane 10 by, for example, sand blasting the membrane 10. The sand blasting can be performed with a sequence of nozzles 75 mounted on a tube 76 that each direct abrasive particle jets 78 onto the membrane 10, as shown in FIG. 5. The abrasive particle jets 78 can be forced out by pressured air or other gases. Suitable abrasive particles include aluminum oxide, silicon oxide, or silicon carbide. Pores or other fine texture features can be formed on the surface of the membrane 10 that is already coarsely textured with peaks 28 and valleys 30, for example, by adding a pore forming material to the membrane 10 during fabrication of the membrane 10. The pore forming material can be dissolved out of the membrane 10 during fabrication of the membrane 10 to form the pores on the membrane surface.

In another aspect of the invention, an integral spacer 80 provides spacing between adjacent membranes 10 to allow the solution stream 20 to flow across substantially all the exposed surfaces 24 of the membrane 10. The integral spacer 80 is bonded to the textured membrane 10 to form a unitary article such that the membrane 10 and integral spacer 80 form a single structure. Advantageously, by being bonded to the membrane 10, the integral spacer 80 is not displaced from its position on the membrane 10 during the process of transporting the membrane 10 as rolls or sheets, or during the fabrication of cartridges or electrochemical cells using the water-splitting membrane 10. The integral spacer 80 can be adhered to either one or both of the exposed surfaces 24a,b of the membrane 10. This integral spacer 80 should be formed of a non-conducting material, such as a dielectric material, that maintains its shape in the solution to be treated. The thickness of the integral spacer 80 can vary over a wide range that depends upon the particular ion removal application. For example, a thicker spacer 80 can provide a stiffer membrane 10 which may not be useful for preparing a spiral wrapped cell design but which exhibits particularly low pressure drop even at high flow rates. A thinner spacer 80 allows more concentric layers of water-splitting membrane 10 to be wrapped in a given volume, thereby providing greater specific volume capacities. The spacer 80 has a thickness which is sufficiently high to substantially prevent physical contact between adjacent membranes, which is typically at least about 10 microns. The maximum spacer thickness, for practical reasons, is less than about 1000 microns. Spacer thickness greater than 1000 microns reduce specific volume capacity with little benefit to reducing pressure drops in most applications. It is also important to avoid blocking the valleys 30 defined by the texture features 26 to allow the solution stream 20 to flow substantially unrestricted across the exposed surface 24 of membrane 10 and between the peaks 28.

The integral spacer 80 may be applied to the water splitting membrane 10 by any method that provides spacing of adjacent membranes 10. Suitable methods for applying the integral spacer 80 to the membrane 10 include spraying continuous polymer filament onto the texture surface 24 of the membrane 10, using a sprayer nozzle 86 that is connected via a feedtube 88 to a polymer tank 85. The molten filament polymer is forced through a feedtube 88 by pressurized hot air from a tank 90 controlled by a feed valve 92. Upon cooling the hot sprayed filaments form an integral spacer which is a randomly interspersed net of filaments. The polymer tank 85 can contain an un-cured liquid polymer precursor or a molten thermoplastic or thermoset polymer. Air temperature, air flow rate, distance from the membrane surface, and polymer softening temperature are selected to form a desired thickness of the integral spacer 80 while avoiding sagging of the hot polymer/fiber layer into the valleys 30 or other depressions of the textured features 26 formed on the exposed surface 24 of the membrane 10—while providing good adhesion of the integral spacer 80 to the membrane 10. In another method, filaments 82 coated with a solution through which the textured membrane 10 is passed, can be applied onto the membrane 10 to form the integral spacer 80. In yet another method, gravure coating of the crowns 44 of the peaks 28 of the texture features 42, can also be used to form the integral spacer 80. The integral spacer 80 can also be fabricated by methods, such as for example, those used for the preparation of non-woven fabrics. While the textured membranes 10 may have only one textured surface, to obtain uniform flow of the solution stream across both membrane surfaces 24*a,b*, it can be preferred to employ textured membranes 10 that have surface texturing on both surfaces for use of the integral spacer 80; otherwise, a spacer 80 laying flat against a membrane surface can block the flow of a solution stream or cause the solution to preferentially flow past a textured surface 24*a* and potentially preventing it from efficiently flowing across opposing or adjacent flat surface 24*b* of a membrane 10.

The integral spacer 80 between the membranes 10 provides a significant reduction in volume of an electrochemical cell 102. Conventional spacer layers, while they can still be used, have to be sufficiently thick to be free-standing and structurally sound to withstand handling when inserted between the textured membranes 10 in the fabrication of a cell 102. Typically, conventional spacer layers are fabricated from polymer, such as polyethylene or polypropylene, and have a thickness of from about 0.25 to about 1 mm. Spacer layers thinner than 0.25 mm are difficult to handle and can result in stretching of spacer strands, tearing or creasing, in the assembly of cells, and they are also generally more difficult to make. A further problem in attempting to reduce spacer thickness arises because the pressure of the solution passed through the cell needs to be increased to deliver the same solution flow rate. Thus, conventionally, relatively thick spacer layers are used in a cell 102 which increases the bulk volume of the cell and reduces solution treatment output per unit volume of cell space. However, conventional spacer layers can still be used with the textured membranes 10 to provide effective electrochemical cells 102, especially when space and cell volume is not of primary concern, or for example, when the space between the membranes 10 needs to be larger than that provided by the integral spacers 80.

Figure 6:
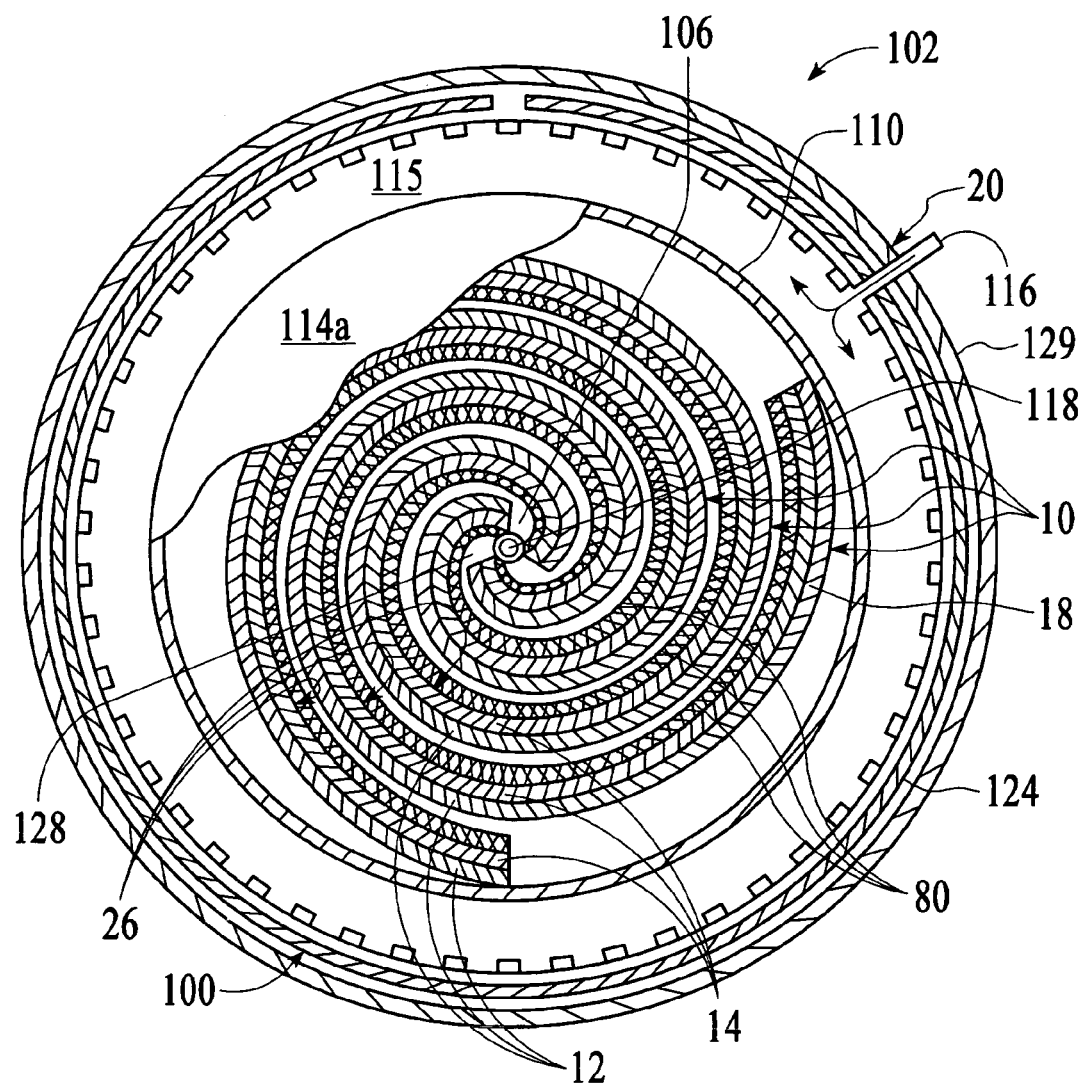
FIG. 6 is a schematic sectional top view of an electrochemical cell comprising a cartridge having membranes with integral spacers that are spirally wound around a core tube.
Figure 7:
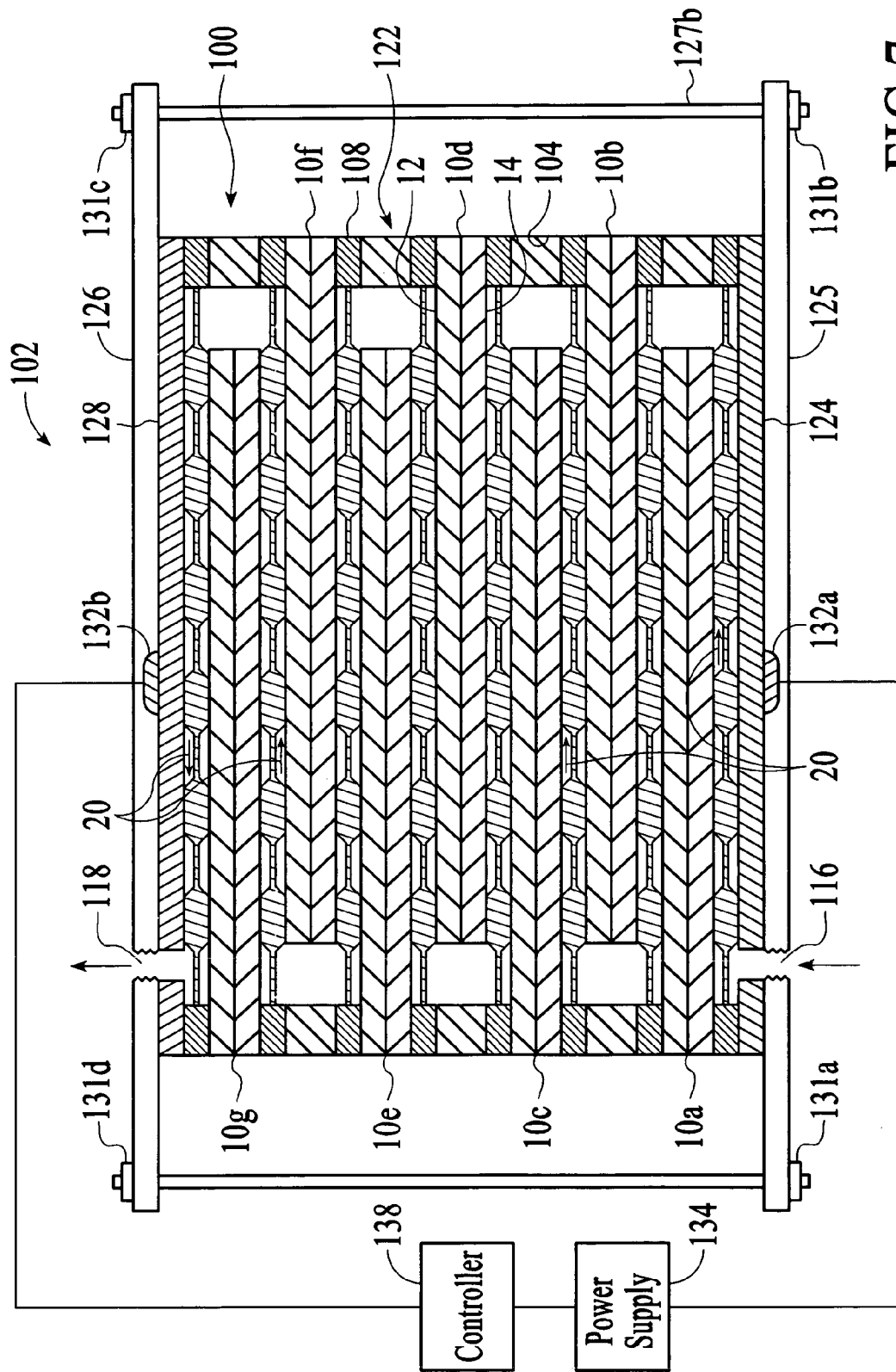
FIG. 7 is a schematic sectional view of an electrochemical cell comprising a cartridge comprising membranes stacked in a plate and frame cell.

The textured membranes 10 and optional integral spacers 80, or separate spacer layers, are assembled into a cartridge 100 that facilitates installation and removal of the membranes 10 from an electrochemical cell 102, embodiments of which are shown in FIGS. 6 and 7. The cartridge 100 can be easily removed from the cell 102, which may be necessary when the space between the adjacent pairs of membranes 10 and their integral spacers 80 become clogged, for example, with calcium carbonate scale or other solid materials. The cartridge 100 also facilitates shipment of replacement membranes 10 to the distributor or end user. In addition, the cartridge 100 also allows a particular membrane configuration that promotes efficient ion exchange to be fabricated.

In one embodiment, the cartridge 100 comprises several membranes 10 with integral spacers 80 that are spirally wound around a core tube 106, which is typically cylindrical, as shown in FIG. 6. The spirally wound membranes 10 can be enclosed by an outer sleeve 110, and sealed at both ends with two end caps 114. When the membrane 10 does not have an integral spacer 80, the cartridge 100 is fabricated with a spacer sleeve (not shown) between each membrane 10, as for example, described in commonly assigned U.S. patent application Ser. No. 10/637,186, filed on Aug. 8, 2003, entitled "Selectable Ion Concentration with Electrolytic Ion Exchange," which is incorporated herein by reference in its entirety. The surfaces of the outer sleeve 110, core tube 106 and end caps 114 direct the solution stream 20 through a solution passageway 115 that passes across the exposed surfaces 24 of the textured membrane 10 in traveling from the inlet 116 to the outlet 118 of the cell 102. The cartridge 100 may be designed for a variety of flow patterns, for example end-to-end flow (parallel to the cored tube 106) or inner-to-outer flow (radial flow to or from the core tube 106). Each end cap 114*a,b* of the cartridge 100 can be a flat plate mounted on either end of the core tube 106. The core tube 106, outer sleeve 110 and end-caps 114*a,b* are designed to provide a solution passageway 115 that provides the desired flow pattern across substantially the entire membrane surface. For example, for the solution stream 20 to flow radially to or from the core tube 106, across both the inner and outer surfaces of each textured membrane 10, the end-caps 114*a,b* seal the ends of the spirally wound membrane to prevent solution from by-passing the membrane surface on its way from inlet to outlet. The textured membranes 10 can also be arranged in the cartridge 100 to provide a solution passageway 115 that forms a unitary and contiguous solution channel that flows past both the anion and cation exchange layers 12, 14 of each membrane 10. Preferably, the unitary channel is connected throughout in an unbroken sequence extending continuously from the inlet 116 to the outlet 118, and flowing past each anion and cation exchange layers 12, 14, respectively, of the water-splitting membranes 10. Thus the unitary and contiguous channel's perimeter comprises at least a portion of all the cation and anion exchange layers 12, 14, of the membranes 10 within the cartridge 100.

The membranes 10 can be spiral wrapped with the integral spacers 80 formed on the inner surface of a cation exchange layer 14 separating it from the adjacent anion exchange layer 12, and providing the solution passageway 115 therebetween. In this one embodiment, three membranes 10 are spiral wrapped to form a parallel flow arrangement, which means that the solution can flow from inlet to outlet in three equivalent passageways between membrane layers. For any flow pattern, for example parallel or radial relative to the core tube 106, one or more membranes 10 can be wrapped in a parallel arrangement to vary the pressure drop across the cartridge 100, the number of membranes 10 that are being wrapped in a parallel flow arrangement selected to provide the desired pressure drop through the cell 102. While the membranes 10 are generally tightly wound against each other, for pictorial clarity, the membranes 10 are shown loosely wound with spaces between them. In this version, the wrapped cartridge 100 is absent electrodes, which are positioned outside the cartridge in the cell.

The cartridge 100 is positioned within a housing 129 of the electrochemical cell 102, which has the solution inlet 116 for introducing an influent solution stream 20 into the cell and the solution outlet 118 that provides an effluent solution stream. An outer electrode 124 and a central electrode 128 are positioned in the housing 129 such that the cation exchange layers 14 of the membranes 10 face the first electrode 124, and the anion exchange layers 12 of the membranes 10 face the second electrode 128. The electrodes 124, 128 are fabricated from electrically conductive materials, such as metals which are preferably resistant to corrosion in the low or high pH chemical environments created during positive and negative polarization of the electrodes during operation of the cell 102.

Suitable electrodes 124, 128 can be fabricated from corrosion-resistant materials such as titanium or niobium, and can have an outer coating of a noble metal, such as platinum. The shape of the electrodes 124, 128 depends upon the design of the electrochemical cell 102 and the conductivity of the solution stream 20 flowing through the cell 102. Suitable electrodes 124, 128 comprise a wire arranged to provide a uniform voltage across the cartridge. However, the electrodes 124, 128 can also have other shapes, such as cylindrical, plate, spiral, disc, or even conical shapes.

The cell 102 can also have other embodiments, such as for example, a plate and frame configuration, as shown in FIG. 7. In this embodiment, the electrochemical cell 102 comprises a cartridge 100 having a number of textured membranes 10a-g having a rectangular shape, which are stacked on top of one another and attached to the sidewalls 122 of the cell to form an interdigited arrangement. The membranes 10a-g are separated by gaskets 104 and spacers 108 between pairs of adjacent membranes. Openings 121 are punched into one end of each membrane 10a-g just inside the outline of the gasket 104, and the membranes 10a-g are positioned such that the openings are positioned on alternating ends of the stack to form unitary and continuous solution passageway 115 through the cartridge 100. The gaskets 104 are flexible to prevent leakage of the solution through the sidewalls 122 of the cartridge 100, and are made of an electrically insulating material to prevent shorting or divergence of the electrical current channel through the sidewalls 122. This forces the electrical current channel, or the electrical field between the electrodes 124, 128 to be directed substantially perpendicularly through the plane of the membranes 10a-g to provide more efficient ion removal or replacement. The spacers 108 may be integral spacers (not shown) or separable spacers 108 (as shown) such as netting made from a dielectric material, such as plastic. The Spacers 108 separate the membranes 10a-g to provide more uniform solution flow and create turbulence in the solution stream passageway 115 to provide higher ion transport rates. Two electrodes 124, 128 comprising, for example, plates of titanium coated with noble metal catalyst, are positioned on either end of the stacked membranes 10a-g. Rigid plates 125, 126, made from plastic, are placed over the electrodes 124, 128. The electrodes 124, 128, membranes 10 a-g, and gaskets 104, are compressed using metal bolts 127 a,b passing through the edges of the rigid plates 125, 126 which extended beyond the edge of the membrane/gasket/electrode stack. The bolts 127a,b are tightened with the nuts 131 a-d at the ends of the bolts. Electrical connections are made to terminals 132 a,b of the electrodes. This embodiment is advantageous when uniform current density across all the membranes 10a-g is required. This cell design with integral spacers also allows higher ion removal or replacement rates due to the larger total surface area of membrane 10 a-g in contact with the solution stream 20, while at the same time allowing the treatment of greater volumes of solution due to the larger ion exchange capacity.

Figure 8:
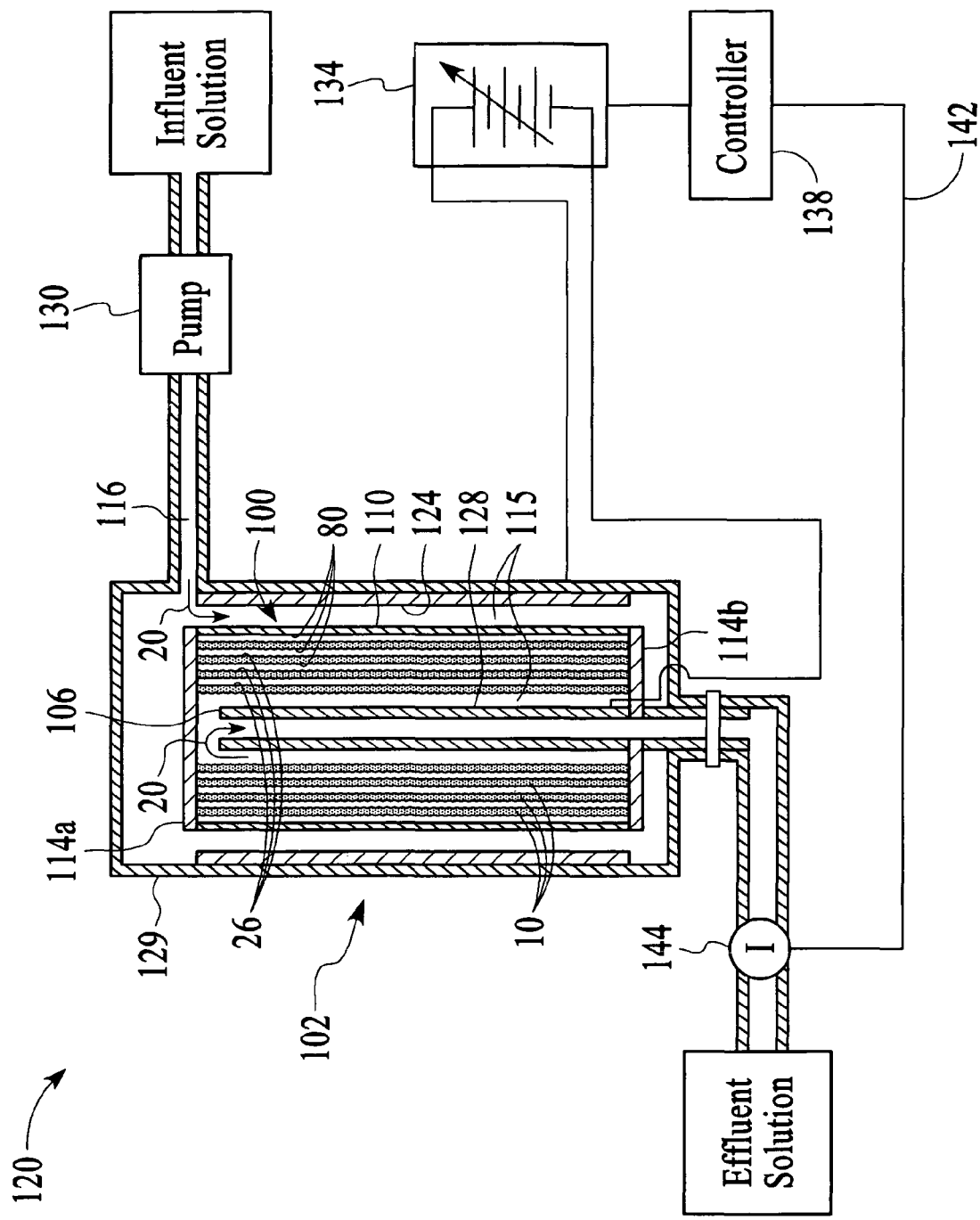
FIG. 8 is a schematic view of an ion controlling apparatus having an electrochemical cell with a membrane cartridge and capable of providing a selected ion concentration in a solution stream.

FIG. 8 presents an embodiment of an ion controlling apparatus 20 to provide a selected ion concentration in a product stream using an electrochemical cell housing a cartridge. A pump 130 can be used to pump the solution stream through the cell 102, such as a peristaltic pump or water pressure from the city water supply in combination with a flow control device. A power supply 134 powers the first and second electrodes 124, 128. The power supply 134 can be capable of maintaining the first and second electrodes 124, 128 at a single voltage, or a plurality of voltage levels during an ion exchange stage. The power supply 134 can be a variable direct voltage supply or a phase control voltage supply as described in aforementioned patent application Ser. No. 10/637,186. In one version, the power supply 134 comprises a variable voltage supply that provides a time modulated or pulsed direct current (DC) voltage having a single polarity that remains either positive or negative, during an ion removal step, or during an ion rejection step. In contrast, a non-DC voltage such as an alternating current (AC) supply voltage, has a time-averaged AC voltage that would be approximately zero. Employing one polarity over the course of either an ion removal (deionization) or ion rejection (regeneration) step in the operation of the electrolytic ion exchange cell 102 allows ions in the solution 20 being treated to travel in a single direction toward or away from one of the electrodes 124, 128, thereby providing a net mass transport of ions either into or out of the water-splitting membranes 10. The magnitude of the average DC voltage is obtained by mathematically integrating the voltage over a time period and then dividing the integral by the time period. The polarity of the integration tells whether one is in ion removal or rejection mode, and the magnitude of this calculation is proportional to the electrical energy made available for ion removal or rejection.

An output ion sensor 144 can also be positioned in the solution stream exterior to the outlet 118 (as shown) or interior to the housing 129 to determine the ion concentration of the treated solution. The ion sensor 144 can measure, for example, concentration, species, or ratio of concentrations of ions in the treated solution. In one version, the ion sensor 144 is a conductivity sensor, which is useful to determine and control total dissolved solids (TDS) concentration in the treated effluent solution 20. Alternatively, the ion sensor 144 can be a sensor specific to a particular ionic species, for example nitrate, arsenic or lead. The ion specific sensor can be, for example, ISE (ion selective electrode). Generally, it is preferred to place the ion sensor 144 as far upstream as possible to obtain the earliest measurement. The earlier the ion sensor measurement can be determined in this embodiment, the more precisely can be controlled the ion concentration of the treated solution.

A controller 138 can operate the power supply 134 in response to an ion concentration signal received from the ion sensor 144 via a closed control feedback loop 142. The controller 138 is any device capable of receiving, processing and forwarding the ion sensor signal to the power supply 134 in order to adjust the voltage level, such as for example, a general purpose computer having a CPU, memory, input devices and display—or even a hardware controller with suitable circuitry. In one version, the controller sends a control signal to the power supply 134 to control the voltage output to the electrodes 124, 128. The controller 138 comprises electronic circuitry and program code to receive, evaluate, and send signals. For example, the controller can comprise (i) a programmable integrated circuit chip or a central processing unit (CPU), (ii) random access memory and stored memory, (iii) peripheral input and output devices such as keyboards and displays, and (iv) hardware interface boards comprising analog, digital input and output boards, and communication boards. The controller can also comprise program code instructions stored in the memory that is capable of controlling and monitoring the electrochemical cell 102, ion sensor 144, and power supply 134. The program code may be written in any conventional computer programming language. Suitable program code is entered into single or multiple files using a conventional text editor and stored or embodied in the memory. If the entered code text is in a high level language, the code is compiled, and the resultant compiler code is then linked with an object code of pre-compiled library routines. To execute the linked, compiled object code, the user invokes the object code, causing the CPU to read and execute the code to perform the tasks identified in the program. An electrochemical cell 102 having the textured membranes 10, and optional integral spacer 80 overlying the membrane 10, provides better control of the ion composition of the treated solution stream, in comparison with conventional electrochemical cells, and the ion concentration in the treated solution stream can be further improved by closed loop control system.

One method of comparing the ion exchange results from a conventional cell having un-textured membranes to the results obtained from a cell 102 having textured membranes 10, is the power law equation provided as Equation (3). In this equation, L is the fraction of ions left in solution after passing over N segments of the textured membrane 10 each having a geometric area A. Thus if membrane segment A leaves 50% of ions in solution, then two sequential membrane segments A will leave $A^2=0.5^2=0.25$ or 25% of ions in solution (for a TDS reduction of 75%). The key is to measure the value of A from an experiment under well-defined and consistent regeneration and deionization conditions (including volume of water deionized).

$$L=A^N \qquad (3)$$

Equation (3) allows normalization of results for cells 102 that each having different total membrane areas and/or different membranes. For example, assuming that a first cell has a total membrane area of $0.070 \, m^2$; to use Equation 3, one must first define an area A, which will be consistently applied for all calculations and comparisons, for example, let $A=0.1 \, m^2$ (it can be any value). For a cell according to this example, $N=0.70$ (the actual cell is $0.070 \, m^2$, so it contains 0.7 units of the defined membrane area A). The ion removal or replacement experiment is completed under specified conditions, including volume of solution deionized, which for this example is 1 liter. The experiment measures L, the fraction of ions left in the treated solution. Assume that $L=0.6$ (60% ions left in solution) for this cell, $N=0.70$, then one calculates $A=0.482$. Now one can determine the liters of challenge water that can be treated to any TDS reduction level, for this example say 90% reduction. by $1 \, m^2$ of this membrane (where 90% TDS reduction and the one square meter serve as the normalization factors). Let $L=0.1$, $A=0.482$, and ones calculates $N=3.16$. Thus the geometric area of membrane to treat 1 liter of water to 90% TDS reduction is $0.316 \, m^2$; and the liters of water which can be reduced by 90% TDS reduction under the specified conditions is $3.16 \, liters/m^2$. One can then compare various membranes, textured and untextured, by the volume of water that can be treated to 90% TDS reduction, as an example, per $1 \, m^2$ membrane.

EXAMPLES

The following examples demonstrate the effectiveness of the ion controlling apparatus 120, electrochemical cell 102, and membranes 10 fabricated according to the present invention. In these examples, membranes 10 were fabricated by different methods and their ion exchange performance in electrochemical cells evaluated for comparisons.

Examples 1 and 2

These examples were performed to compare the performance of a conventional first electrochemical cell having un-textured membranes to the performance of a second electrochemical cell 102 fabricated with textured membranes 10. In both types of cells, the membranes were made by laminating together a pair of cation and anion exchange layers. The cation exchange layer was made from a mixture of 72 wt % strong acid ion exchange resin powder with the tradename CG8-PWD available from Resintech, mixed with a polyethylene binder, such as SLX 9090 from Exxon. The anion exchange layer 12 was made from a mixture of 65 wt % strong base ion exchange resin powder with the tradename SBG1P-PWD, also available from Resintech and the same polyethylene binder. The anion and cation exchange materials were each separately mixed on a Banbury mixer. Each of the mixed compositions were then separately pressed into slabs, swollen in water, then cut into the 7 by 14 cm pieces. Pairs of anion and cation exchange slabs were laid on top of each other to form a membrane sheet.

In Example 1, a conventional electrochemical first cell, similar to the one shown in FIG. 7, was built using a plate and frame construction. Seven, un-textured (flat) water swollen membrane sheets, each about 2 mm thick provided a total geometric area of about $0.0702 \, m^2$. Holes were punched into one end of each membrane sheets at the corners just inside the gasket outline, and the membrane sheets were stacked on one another with the holes positioned on alternating ends of the stack to build a plate and frame cell. The membrane sheets were separated by rubber gaskets (1 mm thick) with dielectric netting (also 1 mm thick) to prevent membranes from contacting one another.

Two electrodes each comprising a contiguous sheet titanium coated with a proprietary noble metal catalyst, referred to as DSA electrode, available from Electrode Corporation were positioned on the two ends of stack. This stack was placed between two rigid plastic plates sized 17 cm by 10 cm and 2.5 cm thick. The plates, membranes and gaskets were compressed using metal bolts passing through the edges of the plates. Electrical connections were made between the electrodes and washers mounted on the outside of the plastic plates using metal springs.

A power supply was used to supply a current to the electrodes of the first cell that was limited to no more than 240 mA at a voltage of 120 V. The cell was then regenerated with water having a conductivity of 60 uS/cm at 20 ml/minute for a total of 30 minutes. A water solution stream comprising 380 ml of a 750 ppm NaCl (having a conductivity of 1550 uS/cm) at a flow rate of 50 ml/minute was deionized in the cell. The total dissolved solids (TDS) removed from the treated solution from the first cell was measured as 89%. Using the power law normalization technique to calculate the volume of water each square meter of membrane treated under these flow and power conditions to provide 90% R, one obtains $4.7 \, liters/m^2$ geometric membrane area for this deionization volume with the recited regeneration and deionization conditions using un-textured membrane.

In Example 2, a second electrochemical cell 102 was fabricated with textured membranes 10 fabricated by embossing the dry, flat water-splitting membrane sheets used for Example 1. Pairs of cation and anion exchange slabs were pressed between two rigid, metal textured plates in a hot press to form texture features 26 shaped as parallel, spaced apart, ridges 36 and furrows 38, on both sides of the membrane 10, and running parallel to the direction that the solution stream would run across the membrane. The texture features 26 had $d_{pv}$ (peak to valley) dimensions of about 0.08 cm and $d_{pp}$ (peak to peak) dimensions of 0.15 cm. These textured membranes 10 were swollen in water and cut into seven 7 cm by 14 cm slabs, providing a total geometric area of about $0.0702 \, m^2$. Cell construction and operation were provided as in Example 1. This second cell 102 provided a TDS reduction of 95% for the same 0.38 liters of 750 ppm NaCl deionized in the cell;

this equates to 6.8 liters/m² membrane for 90% TDS reduction when using these textured membranes.

Thus, the second cell 102 of Example 2 having textured membranes provided a 45% improvement in membrane performance as compared with the first cell of Example 1 which had un-textured membranes. This represented a significant and unexpected improvement in membrane performance for the same geometric area of membranes and process conditions.

Examples 3 and 4

In these examples, the performance of a cell having spirally wound un-textured membranes was compared to a cell 102 having spirally wound textured membranes 10. In both cells, the membranes 10 were fabricated from a cation exchange layer 14 made from a blend of 60 wt % strong acid ion exchange resin powder (CG8-PWD; from Resintech) and 40 wt % polyethylene (SLX-9090; from Exxon), and an anion exchange layer 12 made from 65 wt % anion exchange resin powder (SBG1P-PWD; Resintech) and 34 wt % of the polyethylene. The ion exchange resin powders are <150 um and comprise <2% water. The cation and anion exchange materials were each mixed on a Banbury mixer taking care not to thermally degrade the ion exchange resins. Membrane sheets were formed by sheet extrusion using a 25.4 cm wide extrusion die. The cation exchange layer was extruded first to form a 0.025 cm thick sheet, and the anion exchange layer extruded on top of this to produce a water-splitting membrane. A second calendaring step using the extrusion roll stack was employed to thin the sheet to 0.028 cm thick, and upon swelling in water the flat water-splitting membrane sheet was about 0.038 cm thick.

In Example 3, a cartridge for a third cell was formed by spirally winding around a core tube six membrane pieces, each 100 cm long and 15 cm wide, and with six plastic netting spacers (0.010 inch) thick (Netting 4122; Delstar) therebetween. The 12 layers were wound by laying them on a flat surface one on top of the other in an alternating pattern, with each membrane separated by a spacer net, and the membrane ends offset by 1 cm. A rigid plastic netting tube 15 cm long (RN 2540; Internet, Inc.) was used as the core tube around which the membranes and spacers were wound. After rolling the 12 membrane and spacer layers around the core tube, the wound assembly was contained with a larger net tube prepared from flat netting (XN 1678, Internet, Inc.). This wound assembly was cut to 13.0 cm in length, and the two end caps were attached with thermoplastic adhesive. One of the end caps comprised an o-ring to provide a sealed passage for water to flow into and out of the cartridge. The final cartridge with end caps was 13.8 cm tall with an 8.9 cm diameter, and comprised 0.78 m² of water-splitting membrane.

The cartridge of Example 3 was characterized by placing it in a cylindrical housing comprising an inner and outer electrode, a central riser tube as one housing port, and a second port near the top of the housing's outer wall. The cartridge was first regenerated over 20 minutes with water flow in the direction inside to outside (feed water conductivity was 50 uS/cm), power was limited to a maximum current of 0.5 Amps at 250 Volts, and flow rate was 0.1 liters/min to produce a 2 liter waste volume (average conductivity of 1750 uS/cm). For de-ionization, electrode polarity and flow direction were reversed, and feed water (950 uS/cm) was pumped into the cell at 0.60 liters/minute to produce 6.4 liters exhibiting 67% TDS reduction. Using the power law normalization technique to calculate the volume of water each square meter of membrane can treat under these flow and power conditions to provide 90% R (TDS reduction), one obtains 4.9 liters/m² area for this deionization volume for this un-textured membrane.

In Example 4, a cartridge for a fourth cell 102 was fabricated from textured membranes 10 having texture features 26 shaped as parallel, spaced apart, ridges 36 and furrows 38, with a $d_{pv}$ (peak to valley) dimensions of about 0.020 cm and $d_{pp}$ (peak to peak) dimensions of 0.030 cm. The textured membrane 10 was prepared from the same flat, 0.028 cm thick, two-layer membrane sheet used in the previous cell, by passing this membrane sheet between two metal rolls having the desired texture pattern, as shown in FIG. 5. In the texturizing step, the flat membrane sheet was passed through a short pre-heater to soften the membrane 10, then between the textured rolls themselves which were also heated to a temperature sufficiently high (about 100 C) to impress the texture pattern into the membrane sheet. The textured membrane sheet was subsequently swollen in water to provide a textured membrane 10 for spiral winding into a cartridge.

The cartridge in Example 4 was constructed exactly as in Example 3, and characterized in the same cell under the identical conditions. Thus the membrane geometric surface area remained 0.78 m². The regeneration water volume was 2450 uS/cm. The 6.4 liter deionization volume exhibited 90% TDS reduction. Using the power law normalization, this equates to 7.4 liters/m² to obtain 90% TDS reduction for this deionization volume using this textured membrane.

Thus a 51% improvement in membrane 10 performance was realized for the spiral wound cell of Example 4 which had textured membranes, as compared to the spiral wound cell of Example 3 which was made from un-textured membrane having the same geometric area.

Examples 5 and 6

These examples demonstrate the excellent performance of a cartridge comprising textured membranes 10 having integral spacers 80, as compared with a cartridge having textured membranes 10 that are separated by separate spacer layers. In Example 5, a cartridge 100 was prepared from textured membranes 10 comprising about 50 wt % of weak acid cation exchange resin (HP333 from Rohm and Haas) and strong base anion exchange resin (SIR100 from Resintech). Six membrane sleeves were constructed, each sleeve being about 85 cm long and 0.064 cm thick, and six 0.0254 cm (10 mil) thick netting spacers were wound and trimmed to a total length of 13.8 cm which was then fitted with end-caps. Thus total membrane surface geometric area was 0.70 m² and the diameter was 8.9 cm. The cartridge was characterized in an electrochemical cell as described in Examples 3 and 4, to provide 90% TDS reduction from 6.4 liters of a solution stream of water with an initial conductivity of 950 μS/cm. The pressure drop to provide 0.60 liters/minute flow rate was 6 psi.

Figure 4:
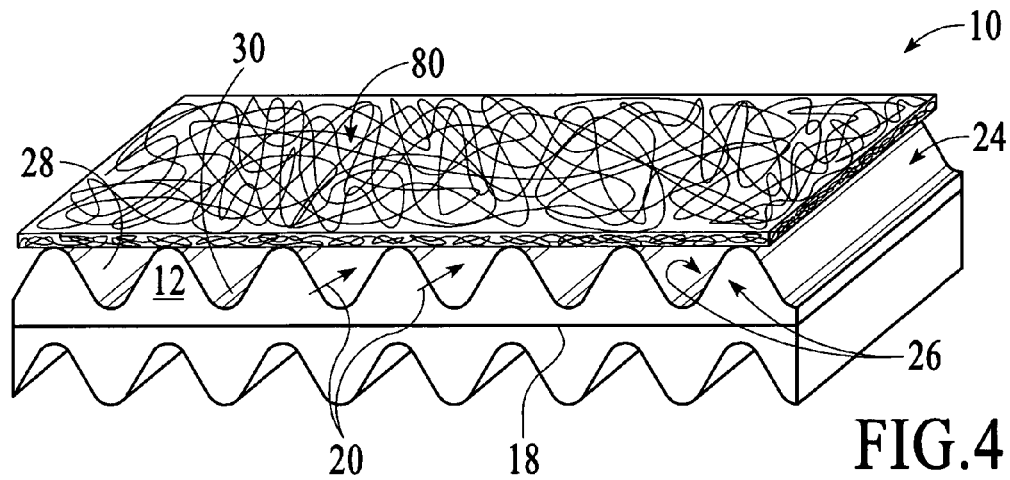
FIG. 4 is a schematic perspective view of another embodiment of the ion exchange membrane with an integral spacer of sprayed filaments formed over the texture features.

In Example 6, prior to swelling the textured membranes 10 with water, a spacer 80 was formed on the membranes 10 by spraying filaments 82 from a thermoplastic spray gun assembly onto the cation exchange layer 14 of the membrane 10. The filaments 82 were made with a Pro-Flex Application system available from Hot Melt Technologies, Michigan. The filaments 82 were approximately 50 microns (0.002 inch) in diameter and sprayed in a random pattern. The spraying process conditions resulted in an integral spacer 80 which rested on top of the texture features 26 of the membrane 10, as shown in FIG. 4. Each integral spacer 80 had an average thickness of about 0.0175 cm (0.007 inch). Eight membrane sleeves each 75 cm long were wrapped on themselves without the use of separate spacers, the wound membrane trimmed to 13.8 cm, and end-caps applied. The total membrane area in the cartridge was 0.83 m² and the diameter was 8.9 cm (19% greater membrane area in the same volume as for Example 5). This cartridge was characterized in Example 5 to provide 84% TDS reduction from 6.4 liters of challenge water. The pressure drop to provide 0.60 liters/minute flow rate was 9 psi.

These results indicate that the integral spacer 80 provide a TDS reduction almost the same as that of the separate spacer between the textured membranes 10, while reducing the volume of the cartridge by about 7%. In addition, the integral spacer 80 was found to have excellent adherence to the membranes 10, thereby facilitating assembly of the membranes and spacer layers into a cartridge configuration.

The electrochemical cell of the present invention provides several advantages. The surface textured membranes 10 with the integral spacer 80 maintains a small, uniform and even gap between the membranes 10, while reducing the overall volume occupied by the electrochemical cell 102. Furthermore, the consistent and small gap distances between the textured membranes 10 with integral spacers 80 reduce current density variation and provide consistent mass transport rates and pressure drops across the gap between the membranes 10. The textured membranes 10 also provide good ion exchange rates and high solution treatment flow rates and outputs. Further, the texture features 26 on the membrane 10 significantly improve the performance of the membrane to provide unexpected benefits for the membranes 10 and electrochemical cells 102.

The present invention has been described in considerable detail with reference to exemplary versions thereof. However, other versions are also possible, as would be apparent to one of ordinary skill in the art. For example, other arrangements of membranes in a cartridge, or electrodes in the electrochemical cell, can also be used depending on the ion concentration of the solution stream, solution volume to be treated, or ion exchange treatment desired. Further, relative terms, such as first, second, outer, inner, are provided only to illustrate the invention and are interchangeable with one another, for example, the first electrode can be the second electrode. Therefore the spirit and scope of the appended claims should not be limited to the description of the preferred versions contained herein.

What is claimed is:

1. A textured water-splitting bipolar membrane comprising:
    (a) an anion exchange layer abutting a cation exchange layer to form a heterogeneous water-splitting interface therebetween; and
    (b) an exposed textured surface having a pattern of texture features comprising spaced apart peaks and valleys, wherein the texture features comprise a dimension of at least about 10 microns.

2. The membrane of claim 1 wherein the peaks are ridges and the valleys comprise furrows between adjacent ridges.

3. The membrane of claim 2 wherein the ridges and furrows are generally parallel to the direction that a solution will travel across the membrane during use of the membrane.

4. The membrane of claim 1 wherein the texture features are formed on both the anion and cation exchange layers.

5. The membrane of claim 1 wherein the peaks comprise conical protrusions or mesas, and the peaks extend out from a substantially flat surface region which defines the valleys.

6. The membrane of claim 1 wherein a solution traveling across the membrane forms a stagnant layer at the membrane surface, and wherein the texture features of the membrane have a dimension that is greater than the thickness of the stagnant layer.

7. The membrane of claim 1 wherein the texture features have a peak to peak distance dpp of at least about 10 microns.

8. The membrane of claim 1 wherein the texture features have a peak to valley distance dpv of at least about 10 microns.

9. The membrane of claim 1 wherein the texture features have an aspect ratio dpv/dpp of at least about 0.1.

10. The membrane of claim 1 wherein the texture features have an aspect ratio dpv/dpp of at least 0.5.

11. The membrane of claim 1 further comprising channels that cut across the peaks.

12. The membrane of claim 1 wherein the anion exchange layer comprises —NR3A groups and the cation exchange layer comprises —SO3M groups.

13. The membrane of claim 1 wherein the anion exchange layer comprises triethyl ammonium (—N(C2H5)3) groups and the cation exchange layer comprises carboxylic acid (—COOH) groups.

14. The membrane of claim 1 comprising an integral spacer on the exposed textured surface.

15. The membrane of claim 14 wherein the integral spacer comprises filaments on the exposed textured surface.

16. The membrane of claim 14 wherein the integral spacer comprises a polymer coating on the peaks of the texture features.

17. The membrane of claim 14 wherein the integral spacer comprises a thickness of less than about 1000 microns.

18. The membrane of claim 14 wherein the integral spacer comprises a thickness of less than about 500 microns.

19. The membrane of claim 1 that is spiral wrapped.

20. A cartridge comprising a plurality of the membranes of claim 1 abutting each other and spiral wrapped.

21. A cartridge for an ion exchanging electrochemical cell, the cartridge comprising:
    (a) a plurality of textured bipolar membranes abutting one another, each membrane having:
        (i) an anion exchange layer abutting a cation exchange layer to form a heterogeneous water-splitting interface therebetween; and
        (ii) an exposed textured surface having a pattern of texture features comprising spaced apart peaks and valleys.

22. The cartridge of claim 21 wherein the peaks are ridges and the valleys comprise furrows between adjacent ridges, the ridges and furrows being generally parallel to the direction that a solution will travel across the membrane during use of the membrane.

23. The cartridge of claim 21 wherein the texture features have a peak to peak distance dpp of at least about 10 microns, and a peak to valley distance dpv of at least about 10 microns.

24. The cartridge of claim 21 wherein the membranes are spirally wound around a core tube.

25. The cartridge of claim 24 wherein the spirally wound membranes are enclosed by an outer sleeve and two end caps.

26. The cartridge of claim 25 wherein at least one end cap has a hole through which an electrode may pass, and forms a seal with a housing.

27. The cartridge of claim 24 which is absent electrodes.

28. The cartridge of claim 21 wherein the plurality of membranes are spiral wrapped.

29. A cartridge for an ion exchanging electrochemical cell, the cartridge comprising:
    a plurality of textured bipolar membranes abutting one another and spiral wrapped, each membrane having:
        (i) an anion exchange layer abutting a cation exchange layer to form a heterogeneous water-splitting interface therebetween; and (ii) an exposed textured surface having a pattern of texture features comprising spaced apart peaks and valleys.

30. The cartridge of claim 29 comprising an integral spacer attached to at least one membrane, the integral spacer comprising filaments on the textured surface or a coating on the peaks.

31. The cartridge of claim 30 wherein the integral spacer comprises a thickness of less than 1000 microns.

32. The cartridge of claim 30 wherein the filaments or coating is composed of a dielectric material.

33. The cartridge of claim 32 wherein the dielectric material comprises polyethylene or polypropylene.

34. The cartridge of claim 29 wherein the texture features comprising peaks are ridges and the valleys comprise furrows between adjacent ridges, the ridges and furrows being generally parallel to the direction that a solution will travel across the membrane during use of the membrane.

35. The cartridge of claim 29 wherein the texture features have a peak to peak distance dpp of at least about 10 microns, and a peak to valley distance dpv of at least about 10 microns.

36. The cartridge of claim 29 wherein the membranes are spirally wound around a core tube.

37. An electrochemical cell for removing or exchanging ions from a solution stream, the electrochemical cell comprising the cartridge of claim 29, and further comprising a housing comprising first and second electrodes about the cartridge.

38. An electrochemical ion exchange system comprising the electrochemical cell of claim 37 and further comprising:
    (a) a power supply for supplying a voltage to the first and second electrodes; and
    (b) a pump for flowing a solution stream through the electrochemical cell.

39. An electrochemical ion exchange system according to claim 38 wherein the power supply is capable of maintaining the first and second electrodes at a plurality of voltage levels during an ion exchange stage.

40. An electrochemical ion exchange system according to claim 39 wherein the voltage levels comprise a range of voltage levels that are selected to maintain a predefined ion concentration range in the effluent solution.

41. The electrochemical cell of claim 37 wherein the electrodes comprise titanium or niobium.

42. The electrochemical cell of claim 41 wherein the electrodes comprise an outer coating of a noble metal.

43. The electrochemical cell of claim 37 wherein an electrode is a spiral.

44. The cartridge of claim 29 wherein the plurality of membranes are spiral wrapped.

* * * * *